United States Patent
Wingo et al.

(10) Patent No.: US 8,141,717 B2
(45) Date of Patent: Mar. 27, 2012

(54) SINTERED POLYMERIC MATERIALS AND APPLICATIONS THEREOF

(75) Inventors: James P. Wingo, Peachtree City, GA (US); Michael E. Witover, Stony Brook, NY (US); Guoqiang Mao, Smyrna, GA (US); Andre Maertens, Dresden (DE); Gerald Kunth, Dresden (DE); Daniel George Fullerton, Atlanta, GA (US); Ike Iaokim Haldopoulos, Fairburn, GA (US); Take Huat Tan, Selangor (MY); Deborah B. Reed, Fayetteville, GA (US)

(73) Assignee: Porex Corporation, Fairburn, GA (US)

( * ) Notice: Subject to any disclaimer, the term of this patent is extended or adjusted under 35 U.S.C. 154(b) by 481 days.

(21) Appl. No.: 11/894,066

(22) Filed: Aug. 20, 2007

(65) Prior Publication Data

US 2008/0197065 A1 Aug. 21, 2008

Related U.S. Application Data

(60) Provisional application No. 60/838,571, filed on Aug. 18, 2006, provisional application No. 60/838,572, filed on Aug. 18, 2006, provisional application No. 60/876,739, filed on Dec. 22, 2006, provisional application No. 60/900,817, filed on Feb. 12, 2007.

(51) Int. Cl.
*B01D 71/00* (2006.01)
*B01D 71/42* (2006.01)
*B01D 71/26* (2006.01)
*B01D 69/00* (2006.01)

(52) U.S. Cl. .......... 210/510.1; 210/500.22; 210/500.34; 210/500.35; 210/500.38; 210/500.4; 210/500.36; 264/126; 264/127

(58) Field of Classification Search .................. None
See application file for complete search history.

(56) References Cited

U.S. PATENT DOCUMENTS

| | | | | |
|---|---|---|---|---|
| 3,287,807 | A | * | 11/1966 | Cornelis |
| 3,689,634 | A | * | 9/1972 | Kliment et al. |
| 3,939,105 | A | * | 2/1976 | Jones et al. |
| 3,975,350 | A | * | 8/1976 | Hudgin et al. |
| 4,220,152 | A | * | 9/1980 | Dresback |
| 4,220,153 | A | * | 9/1980 | Dresback |
| 4,306,033 | A | | 12/1981 | Morita et al. |
| 4,340,067 | A | * | 7/1982 | Rattenborg |
| 4,443,515 | A | | 4/1984 | Atlas |

(Continued)

FOREIGN PATENT DOCUMENTS

CN 101528824 A 9/2009

(Continued)

OTHER PUBLICATIONS

International Search Report and Written Opinion for PCT/US2007/018355 issued by the European Patent Office on Feb. 4, 2008.

(Continued)

*Primary Examiner* — Krishnan S Menon
(74) *Attorney, Agent, or Firm* — Kilpatrick Townsend & Stockton LLP

(57) ABSTRACT

The present invention provides sintered polymeric materials and methods of making the same which are useful in a variety of applications. In one embodiment, the present invention provides a sintered polymeric material comprising at least one plastic and at least one elastomer.

22 Claims, 8 Drawing Sheets

U.S. PATENT DOCUMENTS

| | | | | |
|---|---|---|---|---|
| 4,473,665 | A | * | 9/1984 | Martini-Vvedensky et al. |
| 4,668,564 | A | * | 5/1987 | Orchard |
| 4,724,114 | A | | 2/1988 | McFarland et al. |
| 4,755,178 | A | * | 7/1988 | Insley et al. |
| 4,769,026 | A | * | 9/1988 | Strung |
| 4,820,577 | A | | 4/1989 | Morman et al. |
| 4,822,546 | A | * | 4/1989 | Lohkamp |
| 5,064,653 | A | * | 11/1991 | Sessions et al. |
| 5,125,415 | A | * | 6/1992 | Bell |
| 5,147,646 | A | * | 9/1992 | Graham |
| 5,160,674 | A | * | 11/1992 | Colton et al. |
| 5,175,046 | A | | 12/1992 | Nguyen |
| 5,232,669 | A | * | 8/1993 | Pardinas |
| 5,259,956 | A | | 11/1993 | Mercer et al. |
| 5,266,325 | A | * | 11/1993 | Kuzma et al. |
| 5,320,905 | A | * | 6/1994 | Vaughn et al. |
| 5,364,595 | A | * | 11/1994 | Smith |
| 5,435,713 | A | * | 7/1995 | Yamasaki et al. |
| 5,593,702 | A | * | 1/1997 | Harris et al. |
| 5,599,562 | A | * | 2/1997 | Harris et al. |
| 5,607,550 | A | * | 3/1997 | Akers |
| 5,620,427 | A | | 4/1997 | Werschmidt et al. |
| 5,623,012 | A | * | 4/1997 | Hwo |
| 5,679,380 | A | * | 10/1997 | Munz et al. |
| 5,750,585 | A | | 5/1998 | Park et al. |
| 5,755,709 | A | * | 5/1998 | Cuppy |
| 5,770,086 | A | * | 6/1998 | Indriksons et al. |
| 5,777,060 | A | | 7/1998 | Van Antwerp |
| 5,786,439 | A | | 7/1998 | Van Antwerp et al. |
| 5,797,347 | A | | 8/1998 | Ochi |
| 5,800,372 | A | | 9/1998 | Bell et al. |
| 5,824,328 | A | | 10/1998 | Levy |
| 5,830,185 | A | | 11/1998 | Block, Jr. |
| 5,836,929 | A | | 11/1998 | Bewick-Sonntag et al. |
| 5,851,229 | A | | 12/1998 | Lentz et al. |
| 5,906,631 | A | | 5/1999 | Imran |
| 5,939,086 | A | | 8/1999 | Levy |
| 5,998,032 | A | * | 12/1999 | Hansen et al. ............ 428/403 |
| 6,030,558 | A | | 2/2000 | Smith et al. |
| 6,171,290 | B1 | | 1/2001 | Boisse et al. |
| 6,258,276 | B1 | | 7/2001 | Mika et al. |
| 6,358,569 | B1 | | 3/2002 | Badyal et al. |
| 6,638,610 | B1 | | 10/2003 | Yao |
| 7,743,642 | B2 | | 6/2010 | Chiba et al. |
| 2003/0211799 | A1 | * | 11/2003 | Yao et al. ............ 442/361 |
| 2004/0052689 | A1 | | 3/2004 | Yao |
| 2006/0177352 | A1 | | 8/2006 | Ziegmann et al. |
| 2008/0197065 | A1 | | 8/2008 | Wingo et al. |

FOREIGN PATENT DOCUMENTS

| | | |
|---|---|---|
| EP | 0301753 | 2/1989 |
| EP | 1688181 | 8/2006 |
| EP | 2 059 556 A2 | 5/2009 |
| EP | 1335960 | 8/2009 |
| EP | 2 118 182 A2 | 11/2009 |
| GB | 1592855 | 7/1981 |
| JP | 54111915 | 9/1979 |
| JP | 57064537 | 4/1982 |
| JP | 62225325 | 10/1987 |
| JP | 1171930 | 7/1989 |
| JP | 02117801 | 5/1990 |
| JP | 3197097 | 8/1991 |
| JP | 2000024428 | 1/2000 |
| JP | 2010501664 A | 1/2010 |
| JP | 2010518404 A | 5/2010 |
| MX | 2009001794 A | 7/2009 |
| WO | WO-87/00439 | 1/1987 |
| WO | WO-9909230 | 8/1990 |
| WO | WO-9740870 | 11/1997 |
| WO | WO-9922861 | 5/1999 |
| WO | WO-02/36708 A3 | 5/2002 |
| WO | WO 2005/053821 A1 | 6/2005 |
| WO | WO-2008100500 | 8/2008 |

OTHER PUBLICATIONS

JP10323531A, Derwent Abstract, 1998.

JP 10-323531; English Abstract from Patent Abstracts of Japan and computer translation by Japanese Patent Office, 1998.

JP41165024A, Japan Patent Office (JPO) abstract, 1999.

EP07811431.1, Office Action dated Jun. 30, 2009.

EP07811431.1, Response to Office Action dated Nov. 3, 2009.

PCT/US2001/047056, International Search Report dated Jul. 24, 2002.

PCT/US2008/001838, International Preliminary Report on Patentability dated Aug. 27, 2009.

Ichikawa, Tomoko et al., "Superabsortive Polymers," Concise Polymeric Materials Encyclopedia 1999 , pp. 1523-1524.

Chinese Patent Application No. 200780039008.7, First Office Action mailed Nov. 26, 2010.

Chinese Patent Application No. 200780039008.7, Second Office Action mailed May 18, 2011.

European Patent Application No. 08725464.5, Response to First Office Action filed Apr. 15, 2011.

European Patent Application No. 08725464.5, Summons to Attend Oral Hearing mailed Sep. 23, 2011.

European Patent Application No. 07811431.1, Response to Second Office Action filed Mar. 3, 2011.

European Patent Application No. 07811431.1, Rule 71(3) EPC Communication regarding Intent to Grant Application mailed Apr. 29, 2011.

U.S. Appl. No. 09/699,364, Office Action mailed on May 20, 2005, 8 pages.

U.S. Appl. No. 09/699,364, Office Action mailed on Jan. 24, 2007, 10 pages.

U.S. Appl. No. 09/699,364, Office Action mailed on Jun. 23, 2008, 11 pages.

U.S. Appl. No. 09/699,364, Office Action mailed on Nov. 1, 2010,11 pages.

U.S. Appl. No. 09/699,364, Office Action mailed on Nov. 20, 2007, 11 pages.

U.S. Appl. No. 10/603,765, Office Action mailed on Dec. 29, 2004 8 pages.

U.S. Appl. No. 12/029,850, Office Action mailed on Dec. 8, 2010, 14 pages.

U.S. Appl. No. 12/029,850, Office Action mailed on June10, 2010, 10 pages.

EP Application No. 07811431.1, Office Action mailed on Oct. 28,2010, 4 pages.

EP Application No. 01992750.8, Office Action mailed on Mar. 28, 2008, 4 pages.

EP Application No. 01992750.8, Office Action mailed on Jun. 8, 2006, 3 pages.

EP Application No. 01992750.8, Office Action mailed on Aug. 16, 2007, 5 pages.

International Application No. PCT/US2007/018355, International Preliminary Report on Patentability mailed on Mar. 5, 2009, 8 pages.

* cited by examiner

SINTERED POLYMERIC MATERIALS AND APPLICATIONS THEREOF

RELATED APPLICATION DATA

The present application hereby claims priority under 35 U.S.C. § 119(e) to U.S. Provisional Patent Application Ser. No. 60/838,571 filed Aug. 18, 2006, U.S. Provisional Patent Application Ser. No. 60/838,572 filed Aug. 18, 2006, U.S. Provisional Patent Application Ser. No. 60/876,739 filed Dec. 22, 2006, and U.S. Provisional Patent Application Ser. No. 60/900,817 filed Feb. 12, 2007.

FIELD OF THE INVENTION

The present invention relates generally to sintered polymeric materials and methods of making and using the same.

BACKGROUND OF THE INVENTION

Tips or nibs used in applicators, such as highlighters, pens, cosmetic applicators, and medicament applicators, are typically constructed of felt or thermoplastic fibrous materials including nylon, acrylic, and polyester fibers. Tips or nibs constructed of these materials have good mechanical strength, increasing their resistance to fracture. Moreover, such tips or nibs demonstrate good flow properties of various liquids and have high flexibilities making them suited for use in marking, writing, and other applications.

Several disadvantages, however, exist with felt and fibrous nibs. One disadvantage is the difficulty encountered in producing felt and fibrous nibs having relatively complicated shapes required by various applications. A related disadvantage is that felt and fibrous nibs cannot be produced in a single step. Multi-step production increases costs and places limitations on the various designs felt and fibrous nibs can assume. A further disadvantage is realized upon use of felt and fibrous nibs. Felt and fibrous materials can become frayed and dissociate over the life of the nib. Similarly, fibers can dissolve in the solvent of inks leading to weakening of the nib and further contributing to fraying.

Furthermore, the performance characteristics of applicators comprising felt and fibrous nibs suffer with the deterioration of the felt and fibrous materials. Fraying and other dissociative processes can drastically affect the fineness of an applicator making use thereof difficult and frustrating. Additionally, dissolution of fibers in ink solvents can further complicate matters by leading to excessive ink loss and bleeding.

In view of the foregoing problems and disadvantages, it would be desirable to provide materials demonstrating advantageous mechanical and chemical properties operable to be used as applicators.

Additionally, porous polymeric materials find application and play critical roles in numerous fields. Porous polymeric materials have been widely used in filtration and fluid barrier applications. Current filtration devices often comprise a housing with a polymeric filtration medium disposed in fluid passageways through the housing. As fluid enters the housing, it passes through the filtration medium to remove compositions from the fluid stream. Fluids, as used herein, refer to gases, liquids, or combinations thereof. The efficacy of a filtration device depends on several factors including the ability of the filtration medium to maintain a sufficient seal with the housing to prevent fluid from circumventing the filtration medium.

Fluid circumventing the filtration medium causes significant problems, especially when the filtration medium also serves as a barrier to selected fluids, such as aqueous solutions. Fluid circumventing the filtration medium can contaminate downstream apparatus and processes leading to inconvenience, corrosion and costly repairs of equipment. Pipette devices, for example, often comprise a filtration or barrier medium which allows the passage of fluids such as gasses but prevents the passage of liquids which can contaminate the pipette. Contamination of a pipette by fluids circumventing or bypassing the filtration or barrier medium often requires destruction or decontamination of the pipette due to the potential for subsequent contamination of other solutions.

One disadvantage of present porous polymeric filtration and barrier media is their rigid nature making it difficult to form sufficient seals with housings. This is especially true when either or both the housing and filtration medium have defects resulting from manufacturing or assembly processes. Precise tolerances must therefore be maintained in producing filters comprising filtration media disposed in housings. The requirement of precise tolerances often results in the rejection of a significant amount of product in addition to the potential for the filtration medium to fall out of the housing or otherwise assume an incorrect position within the housing.

In view of the foregoing problems, it would be desirable to provide filtration and barrier media operable to form sufficient seals with housings to prevent fluid bypass without being subjected to the precise tolerances required by present filtration apparatus.

SUMMARY

Sintered Polymeric Materials

The present invention provides sintered polymeric materials and methods of making and using the same. Sintered polymeric materials of the present invention can demonstrate advantageous chemical and mechanical properties, such as resistance to solvents and increased flexibilities, thereby facilitating application of these materials in a variety of fields, including their use in applicators and filtration and barrier media.

In one embodiment, the present invention provides a composition comprising a sintered polymeric material comprising at least one elastomer. In another embodiment, the present invention provides a composition comprising a sintered polymeric material comprising at least one plastic and at least one elastomer. In a further embodiment, the present invention provides a continuous sintered polymeric material comprising a flexible region and a rigid region, wherein the flexible region comprises a first plastic and at least one elastomer, and the rigid region comprises a second plastic.

In another aspect, the present invention provides methods of producing polymeric materials. In one embodiment, a method of producing a polymeric material comprises providing particles of at least one plastic, providing particles of at least one elastomer, and sintering the plastic particles and elastomer particles. In another embodiment, a method of producing a polymeric material comprises disposing particles of a first plastic mixed with particles of at least one elastomer in a first part of a mold, disposing particles of a second plastic in a second part of the mold adjacent to the first part of the mold, and sintering the first plastic particles, second plastic particles, and elastomer particles.

Applicators

The present invention additionally provides applicators comprising sintered polymeric materials as well as methods of making applicators and using the same. Applicators comprising sintered polymeric materials of the present invention can be made into complicated shapes and are resistant to fraying and other dissociative processes common to felt and fibrous applicators.

In one embodiment, the present invention provides an applicator comprising a sintered polymeric material, the sintered polymeric material comprising at least one plastic and at least one elastomer. In another embodiment, the present invention provides an applicator comprising a continuous sintered polymeric material comprising a flexible region and a rigid region, the flexible region comprising a first plastic and at least one elastomer, and the rigid region comprising a second plastic.

The present invention, in another aspect, provides an applicator comprising a sintered porous polymeric component and a fibrous component coupled to the sintered porous polymeric component. In some embodiments, the sintered porous polymeric component comprises at least one plastic. In other embodiments, the sintered porous polymeric component comprises a plurality of plastics. In a further embodiment, a sintered porous polymeric component further comprises at least one elastomer. In some embodiments, an applicator further comprises a reservoir coupled to the fibrous component. In other embodiments, the fibrous component serves as the reservoir.

In another aspect, the present invention provides an applicator comprising a continuous sintered porous polymeric component comprising a flexible region and a rigid region, wherein the flexible region comprises a first plastic and at least one elastomer, and the rigid region comprises a second plastic. A fibrous component is coupled to the continuous sintered porous polymeric component. In some embodiments, a reservoir is coupled to the fibrous component. In other embodiments, the fibrous component serves as the reservoir.

In some embodiments, sintered polymeric materials of applicators further comprise at least one color change indicator. A color change indicator, according to embodiments of the present invention, is operable to at least partially change the color of the sintered polymeric material when contacted with an aqueous and/or organic liquid or composition. In some embodiments, a color change indicator changes the sintered porous material of an applicator from a first color to a second color when contacted with an aqueous and/or organic liquid or composition. In other embodiments, the color change indicator changes the sintered polymeric material from colorless or white to colored. The color change of the sintered polymeric material, according to embodiments of the present invention, depends on the identity of the color change indicator selected. The change in color provides a user an indication that the applicator has contacted a composition for subsequent application of the composition to a surface. In some embodiments, a color change indicator comprises a dye including, but not limited to, organic dyes such as food dyes.

Applicators of the present invention, in some embodiments, can be used in writing, cosmetic, healthcare, and/or industrial applications.

Methods of Producing Applicators

The present invention additionally provides methods of producing applicators comprising sintered porous polymeric materials. In one embodiment, a method of producing an applicator comprises providing particles of at least one plastic, providing particles of at least one elastomer, and sintering plastic and elastomer particles. In another embodiment, a method of producing an applicator comprises providing a sintered porous polymeric component, providing a fibrous component, and coupling the fibrous component to the sintered porous polymeric component. In some embodiments, the sintered porous polymeric component comprises at least one plastic and at least one elastomer. Providing a sintered porous polymeric component comprising at least one plastic and at least one elastomer, in some embodiments, comprises providing particles of at least one plastic, providing particles of at least one elastomer, and sintering the plastic particles and elastomer particles. In some embodiments, at least one color change indicator is added to the plastic and elastomer particles and sintered with the plastic and elastomer particles.

Moreover, in some embodiments, coupling the fibrous component to the sintered porous polymeric component comprises inserting the fibrous component into the sintered porous polymeric component. In other embodiments, coupling the fibrous component to the sintered porous polymeric component comprises inserting the sintered porous polymeric component into the fibrous component. In some embodiments, a method of producing an applicator further comprises coupling a reservoir to the fibrous component.

In another embodiment, a method of producing an applicator comprises providing a continuous sintered porous polymeric component comprising a flexible region and a rigid region, providing a fibrous component, and coupling the fibrous component to the continuous sintered porous polymeric component. In some embodiments, the flexible region of the continuous sintered porous polymeric component comprises a first plastic and at least one elastomer, and the rigid region comprises a second plastic. In some embodiments, providing a continuous sintered porous polymeric component comprising a flexible region and a rigid region comprises disposing particles of a first plastic mixed with particles of at least one elastomer in a first part of a mold, disposing particles of a second plastic in a second part of the mold adjacent to the first part of the mold, and sintering the first plastic particles, the second plastic particles, and the elastomer particles. In some embodiments, at least one color change indicator is added to the first plastic particles, second plastic particles, and/or elastomer particles and sintered.

In some embodiments, coupling a fibrous component to the continuous sintered porous polymeric component comprises inserting the fibrous component into the continuous sintered porous polymeric component. In other embodiments, coupling the fibrous component to the continuous sintered porous polymeric component comprises inserting the continuous sintered porous polymeric component into the fibrous component. In some embodiments, a method for producing an applicator further comprises coupling a reservoir to the fibrous component.

Methods of Applying a Composition to a Surface

In a further aspect, the present invention provides methods of applying a composition to a surface. A method of applying a composition to a surface, in one embodiment, comprises providing an applicator comprising a sintered polymeric material comprising at least one plastic and at least one elastomer, disposing at least a portion of a composition on the applicator, and contacting a surface with the composition on the applicator.

In another embodiment, a method of applying a composition to a surface comprises providing an applicator comprising a sintered porous polymeric component and a fibrous component coupled to the sintered porous polymeric component, disposing at least a portion of a composition on the applicator, and contacting a surface with the composition on the applicator. In some embodiments, the sintered porous polymeric component comprises at least one plastic and at least one elastomer. In other embodiments, the sintered porous polymeric component comprises a flexible region continuous with a rigid region, the flexible region comprising a first plastic and at least one elastomer, and the rigid region comprising a second plastic.

In some embodiments of applying a composition to a surface, disposing at least a portion of the composition on the applicator comprises passing the composition through the fibrous component to an exterior surface of the sintered porous polymeric component.

In some embodiments, a composition can comprise an ink, paint, cosmetic, or pharmaceutical composition. In other embodiments, a composition can comprise anticorrosion materials, UV-protectants, and other chemicals used in industrial applications.

Filtration Media and Barrier Media

The present invention additionally provides filtration and barrier media comprising sintered porous polymeric materials of the present invention and methods of making and using the same. Filtration media, according to embodiments of the present invention, are operable to pass liquids and gases to filter contaminants or other desired species in the liquids or gases. When a liquid or gas flows through a filtration medium of the present invention, contaminants or other desired species, such as target molecules or substances, become associated with the filtration medium and are removed from the liquid or gas.

Barrier media, according to some embodiments of the present invention, however, permit the passage of gases but inhibit and/or prevent the flow of liquids through the media. By permitting the passage of gasses and inhibiting and/or preventing the passage of liquids, barrier media of the present invention can protect downstream equipment and processes from contamination resulting from contact with undesired fluids. Barrier media of the present invention, for example, can serve as in-line barrier media in a pipe or a tube to prevent liquid flow through the pipe or tube. In another embodiment, barrier media can be placed in pipette tips and act as pipette tip filters to prevent pipetted fluid from contaminating the pipettor.

Filtration and barrier media comprising sintered polymeric materials of the present invention can form sufficient seals with housings to prevent fluid circumventing the media without being subjected to the precise tolerances often required by filtration apparatus. Filtration and barrier media comprising sintered porous polymeric materials of the present invention can demonstrate flexible properties allowing the media to conform to variations and inconsistencies in surfaces of the housing thereby facilitating sufficient sealing with the housing and reducing product failure and discardment due to fluid bypass. Moreover, the flexible properties of filtration and barrier media of the present invention can permit the porosity of the media to be adjusted according to various applications.

In one embodiment, the present invention provides a filtration medium comprising a sintered porous polymeric material, the sintered porous polymeric material comprising at least one plastic and at least one elastomer. In another embodiment, the present invention provides a filtration medium comprising a sintered porous polymeric material, the sintered porous polymeric material comprising at least one plastic, at least one elastomer, and at least one color change indicator.

In another embodiment, the present invention provides a filtration medium comprising a continuous sintered porous polymeric material comprising a flexible region and a rigid region. The flexible region of the continuous sintered porous polymeric material, in some embodiments, comprises a first plastic and at least one elastomer, and the rigid region comprises a second plastic. In some embodiments, the flexible region comprises a first plastic, at least one elastomer, and a first color change indicator, and the rigid region comprises a second plastic and a second color change indicator. In another embodiment, the color change indicator may be present in either the flexible region or the rigid region.

In another embodiment, the present invention provides a barrier medium comprising a sintered porous polymeric material, the sintered porous polymeric material comprising at least one plastic and at least one elastomer. In some embodiments, a liquid barrier medium comprises a continuous sintered porous polymeric material comprising a flexible region and a rigid region as provided herein.

In some embodiments, a barrier medium comprising a sintered porous polymeric material comprising at least one plastic and at least one elastomer further comprises at least one super-absorbent material. Super-absorbent materials suitable for use in barrier media, according to embodiments of the present invention, rapidly swell when contacted with solutions, such as water or other aqueous solutions, but do not dissolve in water or aqueous solutions. The swelling of the super-absorbent material, in some embodiments, can seal the barrier medium preventing further flow of fluids through the barrier medium. In other embodiments, a barrier medium comprising a sintered porous polymeric material comprising at least one plastic and at least one elastomer does not include a super-absorbent material.

In a further embodiment, a barrier medium comprising a sintered porous polymeric material comprising at least one plastic and at least one elastomer further comprises a hydrophobic coating such as fluorinated molecular coating as described in U.S. Pat. Nos. 6,638,610 and 6,358,569. In one embodiment, a liquid barrier medium comprising a sintered porous polymeric material comprising at least one plastic and at least one elastomer further comprises at least one color change indicator.

In a further embodiment, the present invention provides an absorbent medium comprising a sintered porous polymeric material comprising at least one plastic and at least one elastomer, wherein the absorbent medium is operable to uptake or absorb liquids and subsequently expel liquids when placed in compression. In such embodiments, the absorbent medium can act as a sponge.

Filters and Apparatus Comprising Filtration Media and/or Barrier Media

In another embodiment, the present invention provides a filter comprising a housing and at least one filtration medium, the at least one filtration medium comprising a sintered porous polymeric material comprising at least one plastic and at least one elastomer. In some embodiments, a filtration medium further comprises at least one color change indicator. In other embodiments of a filter, the at least one filtration medium comprises a continuous sintered porous polymeric material comprising a flexible region and a rigid region. The flexible region of the continuous sintered porous polymeric material, in some embodiments, comprises a first plastic and at least one elastomer, and the rigid region comprises a second plastic. In some embodiments, the flexible and/or rigid region further comprises at least one color change indicator. A housing, in one embodiment, comprises a vacuum filtration housing, a chromatographic column, a funnel, a tube, a syringe, a catheter, a duct, or a pipette tip.

In another embodiment, the present invention provides an apparatus comprising a housing and at least one barrier medium, the at least one barrier medium comprising a sintered porous polymeric material comprising at least one plastic and at least one elastomer. In some embodiments, the at least one barrier medium comprises a continuous sintered porous polymeric material comprising a flexible region and a rigid region. The flexible region of the continuous sintered porous polymeric material, in some embodiments, comprises a first plastic and at least one elastomer, and the rigid region comprises a second plastic. In some embodiments, the flexible and/or rigid region further comprises at least one color change indicator. Moreover, in some embodiments, an apparatus comprises a filter, a pipettor, or a catheter.

A barrier medium, in some embodiments, further comprises a hydrophobic coating, such as, but not limited to, a fluorinated polymeric coating. In some embodiments, a barrier medium further comprises at least one super-absorbent material. Moreover, in some embodiments, a housing comprises a vacuum filtration housing, a funnel, a tube, a duct, a syringe, a catheter, or a pipette tip.

Methods of Producing Filtration Media and Barrier Media

In another aspect, the present invention provides methods of producing a filtration medium comprising a sintered porous polymeric material. In one embodiment, a method of producing a filtration medium comprising a sintered porous polymeric material comprises providing particles of at least one elastomer, providing particles of at least one plastic, and sintering the plastic and elastomer particles. In some embodiments, at least one color change indicator is added to the particles of the at least one elastomer and/or at least one plastic and sintered with the particles of the at least one elastomer and at least one plastic.

In another embodiment, a method of producing a filtration medium comprising a sintered porous polymeric material comprises disposing particles of a first plastic mixed with particles of at least one elastomer in a first part of a mold, disposing particles of a second plastic in a second part of the mold adjacent to the first part of the mold, and sintering the first plastic particles, elastomer particles, and second plastic particles. In some embodiments, particles of at least one color change indicator can be added to the mixture of first plastic particles and elastomer particles prior to sintering. In other embodiments, at least one color change indicator can be added to second plastic particles prior to sintering.

In another aspect, the present invention provides methods of producing a barrier medium comprising a sintered porous polymeric material. In one embodiment, a method of producing a barrier medium comprises providing particles of at least one elastomer, providing particles of at least one plastic, and sintering the plastic and elastomer particles. In some embodiments, at least one super-absorbent material and/or color change indicator is added to the particles of the at least one elastomer and at least one plastic and sintered with the particles of the at least one elastomer and at least one plastic. In a further embodiment, a method for producing a barrier medium comprising a sintered porous polymeric material further comprises coating the sintered porous polymeric material with a hydrophobic coating.

In another embodiment, a method of producing a barrier medium comprising a sintered porous polymeric material comprises disposing particles of a first plastic mixed with particles of at least one elastomer in a first part of a mold, disposing particles of a second plastic in a second part of the mold adjacent to the first part of the mold, and sintering the first plastic particles, elastomer particles, and second plastic particles. In some embodiments, at least one super-absorbent material and/or color change indicator can be added to the mixture of first plastic particles and elastomer particles. In other embodiments, at least one super-absorbent material and/or color change indicator can be added to the mixture of second plastic particles. In a further embodiment, a method for producing a barrier medium comprising a sintered porous polymeric material further comprises coating the sintered porous polymeric material with a hydrophobic coating.

In another aspect, the present invention provides methods of producing a filter. In one embodiment, a method for producing a filter comprises providing a filtration medium comprising a sintered porous polymeric material, providing a housing, and disposing the filtration medium in the housing, wherein the sintered porous polymeric material comprises at least one elastomer and at least one plastic. In some embodiments, the sintered porous polymeric material further comprises at least one color change indicator.

In another embodiment, a method of producing a filter comprises providing a filtration medium comprising a continuous sintered porous polymeric material comprising a flexible region and a rigid region, providing a housing, and disposing the filtration medium in the housing. In some embodiments, the flexible region comprises a first plastic and at least one elastomer, and the rigid region comprises a second plastic. In some embodiments, the flexible region and/or rigid region can further comprise at least one color change indicator. The flexible region of the filtration medium, in some embodiments, conforms to the surface of the housing to form a seal between the filtration medium and the housing. The flexible nature of the flexible region can allow the filtration medium to conform with any variations or inconsistencies in the surface of the housing to facilitate a tight seal resistant to fluid bypass.

Methods of Filtering a Fluid

In another aspect, the present invention provides methods of filtering a fluid to remove compositions from the fluid. In one embodiment, a method of filtering a fluid comprises providing at least one filtration medium comprising a sintered porous polymeric material and passing a fluid through the at least one filtration medium, wherein the sintered porous polymeric material comprises at least one plastic and at least one elastomer. In some embodiments, the sintered porous polymeric material further comprises at least one color change indicator.

In another embodiment, a method of filtering a fluid comprises providing at least one filtration medium comprising a continuous sintered porous polymeric material comprising a flexible region and a rigid region and passing a fluid through the at least one filtration medium, wherein the flexible region comprises a first plastic and at least one elastomer, and the rigid region comprises a second plastic. In some embodiments, the flexible region and/or rigid region can further comprise at least one color change indicator.

In further embodiment, a method for filtering a fluid comprises providing at least one filtration medium comprising a sintered porous polymeric material, adjusting the porosity of the at least one filtration medium, and passing a fluid through the at least one filtration medium, wherein the sintered porous polymeric material comprises at least one elastomer and at least one plastic. In some embodiments, adjusting the porosity of the filtration medium comprises placing the filtration medium in tension or compression. Placing the filtration medium in tension or compression can alter the pore size and/or pore structure of filtration medium thereby changing the porosity of the filtration medium.

In another embodiment, a method of filtering a gas comprises providing at least one liquid barrier medium comprising a sintered porous polymeric material, adjusting the porosity of the at least one liquid barrier medium, and passing a gas through the liquid barrier medium while inhibiting and/or preventing liquid from passing through the liquid barrier medium, wherein the sintered porous polymeric material comprises at least one elastomer and at least one plastic. In some embodiments, adjusting the porosity of the liquid barrier medium comprises placing the liquid barrier medium in tension or compression.

In a further aspect, the present invention provides methods of cleaning filtration media. In one embodiment, a method for cleaning a filtration medium comprises adjusting the pore sizes of the filtration medium to release compositions disposed in the pores wherein the filtration medium comprises at least one plastic and at least one elastomer. In some embodiments, adjusting the pores sizes comprises placing the filtration medium in tension or compression.

These and other embodiments are presented in greater detail in the detailed description which follows.

DETAILED DESCRIPTION

Figure 1:
FIG. 1 illustrates various applicators according to embodiments of the present invention.
Figure 1:
Figure 1:
Figure 1:
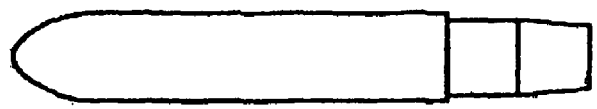

The present invention provides sintered polymeric materials and methods of making and using the same. Sintered polymeric materials of the present invention can demonstrate advantageous chemical and mechanical properties, such as resistance to solvents and increased flexibilities, thereby facilitating application of these materials in a variety of fields, including their use in applicators and filtration and barrier media.

Sintered Polymeric Materials
Sintered Polymeric Materials Comprising Elastomers

In one aspect, the present invention provides sintered polymeric materials and methods of making and using the same. Sintered polymeric materials of the present invention can demonstrate advantageous chemical and mechanical properties, such as resistance to solvents and increased flexibilities, thereby facilitating application of these materials in a variety of fields, including applicators and filtration and barrier media.

In one embodiment, a sintered polymeric material comprises at least one plastic and at least one elastomer. A sintered polymeric material, according to some embodiments, comprises at least one plastic and a plurality of elastomers. In another embodiment, a sintered polymeric material comprises a plurality of plastics and at least one elastomer. In a further embodiment, a sintered polymeric material comprises a plurality of plastics and a plurality of elastomers.

Turning now to components that can be included in sintered polymeric materials of the present invention, sintered polymeric materials of the present invention, in some embodiments, comprise at least one plastic.

Plastics

In some embodiments, sintered polymeric materials of the present invention comprise a plurality of plastics. Plastics, as used herein, include flexible plastics and rigid plastics. Flexible plastics, in some embodiments, comprise polymers possessing moduli ranging from about 15,000 N/cm$^2$ to about 350,000 N/cm$^2$ and/or tensile strengths ranging from about 1500 N/cm$^2$ to about 7000 N/cm$^2$. Rigid plastics, according to some embodiments, comprise polymers possessing moduli ranging from about 70,000 N/cm$^2$ to about 350,000 N/cm$^2$ and have tensile strengths ranging from about 3000 N/cm$^2$ to about 8500 N/cm$^2$.

Plastics suitable for use in sintered polymeric materials of the present invention, in some embodiments, comprise polyolefins, polyamides, polyesters, rigid polyurethanes, polyacrylonitriles, polycarbonates, polyvinylchloride, polymethylmethacrylate, polyvinylidene fluoride, polytetrafluoroethylene, polyethersulfones, polystyrenes, polyether imides, polyetheretherketones, polysulfones, and combinations and copolymers thereof.

In some embodiments, a polyolefin comprises polyethylene, polypropylene, and/or copolymers thereof. Polyethylene, in one embodiment, comprises high density polyethylene (HDPE). High density polyethylene, as used herein, refers to polyethylene having a density ranging from about 0.92 g/cm$^3$ to about 0.97 g/cm$^3$. In some embodiments, high density polyethylene has a degree of crystallinity (% from density) ranging from about 50 to about 90. In another embodiment, polyethylene comprises ultrahigh molecular weight polyethylene (UHMWPE). Ultrahigh molecular weight polyethylene, as used herein, refers to polyethylene having a molecular weight greater than 1,000,000.

Elastomers

In addition to at least one plastic, sintered polymeric materials of the present invention comprise at least one elastomer. In some embodiments, sintered polymeric materials of the present invention comprise a plurality of elastomers. Elastomers suitable for use in sintered polymeric materials of the present invention, according to some embodiments, comprise thermoplastic elastomers (TPE). Thermoplastic elastomers, in some embodiments, comprise polyurethanes and thermoplastic polyurethanes (TPU). Thermoplastic polyurethanes, in some embodiments, include multiblock copolymers comprising a polyurethane and a polyester or polyether.

In other embodiments, elastomers suitable for use in sintered porous polymeric materials of the present invention comprise polyisobutylene, polybutenes, butyl rubber, or combinations thereof. In another embodiment, elastomers comprise copolymers of ethylene and other polymers such as polyethylene-propylene copolymer, referred to as EPM, ethylene-butene copolymer, polyethylene-octene copolymer, and polyethylene-hexene copolymer. In a further embodiment, elastomers comprise chlorinated polyethylene or chloro-sulfonated polyethylene.

In some embodiments, elastomers suitable for use in sintered polymeric materials of the present invention comprise 1,3-dienes and derivatives thereof. 1,3-dienes include styrene-1,3-butadiene (SBR), styrene-1,3-butadiene terpolymer with an unsaturated carboxylic acid (carboxylated SBR), acrylonitrile-1,3-butadiene (NBR or nitrile rubber), isobutylene-isoprene, cis-1,4-polyisoprene, 1,4-poly(1,3-butadiene), polychloroprene, and block copolymers of isoprene or 1,3-butadiene with styrene such as styrene-ethylene-butadiene-styrene (SEBS). In other embodiments, elastomers comprise polyalkene oxide polymers, acrylics, or polysiloxanes (silicones) or combinations thereof.

In a further embodiment, elastomers suitable for use in sintered polymeric materials of the present invention, in some embodiments, comprise FORPRENE®, LAPRENE®, SKYPEL®, SKYTHANE®, SYNPRENE®, RIMFLEX®, Elexar, FLEXALLOY®, TEKRON®, DEXFLEX®, Typlax, Uceflex, ENGAGE®, HERCUPRENE®, Hi-fax, Novalene, Kraton, Muti-Flex, EVOPRENE®, HYTREL®, NORDEL®, VITON®, Vector, SILASTIC®, Santoprene, Elasmax, Affinity, ATTANE®, SARLINK®, etc.

Properties of Sintered Polymeric Materials Comprising Elastomers

A sintered polymeric material, according to some embodiments of the present invention, comprises at least one elastomer in an amount ranging from about 10 weight percent to about 90 weight percent. In other embodiments, a sintered polymeric material comprises at least one elastomer in an amount ranging from about 20 weight percent to about 80 weight percent. In another embodiment, a sintered polymeric material comprises at least one elastomer in an amount ranging from about 30 weight percent to about 70 weight percent. In a further embodiment, a sintered polymeric material comprises at least one elastomer in an amount ranging from about 40 weight percent to about 60 weight percent.

Sintered polymeric materials comprising at least one plastic and at least one elastomer, according to some embodiments of the present invention, are porous. In one embodiment, for example, a sintered polymeric material has a porosity ranging from about 10% to about 90%. In another embodiment, a sintered polymeric material comprising at least one plastic and at least one elastomer has a porosity ranging from about 20% to about 80% or from about 30% to about 70%. In a further embodiment, a sintered polymeric material comprising at least one plastic and at least one elastomer has a porosity ranging from about 40% to about 60%.

Porous sintered polymeric materials comprising at least one plastic and at least one elastomer, according to some embodiments of the present invention, have an average pore size ranging from about from about 1 µm to about 200 µm. In other embodiments, porous sintered polymeric materials comprising at least one plastic and at least one elastomer have an average pore size ranging from about 2 µm to about 150 µm, from about 5 µm to about 100 µm, or from about 10 µm to about 50 µm. In another embodiment, a porous sintered polymeric material has an average pore size less than about 1 µm. In one embodiment, a porous sintered polymeric material comprising at least one plastic and at least one elastomer has an average pore size ranging from about 0.1 µm to about 1 µm. In a further embodiment, a porous sintered polymeric material of the present invention has an average pore size greater than 200 µm. In one embodiment, a porous sintered polymeric material comprising at least one plastic and at least one elastomer has an average pore size ranging from about 200 µm to about 500 µm or from about 500 µm to about 1 mm.

Sintered polymeric materials comprising at least one plastic and at least one elastomer, according to some embodiments, have a density ranging from about 0.1 g/cm$^3$ to about 1 g/cm$^3$. In other embodiments, a sintered polymeric material of the present invention has a density ranging from about 0.2 g/cm$^3$ to about 0.8 g/cm$^3$ or from about 0.4 g/cm$^3$ to about 0.6 g/cm$^3$. In a further embodiment, a sintered polymeric material comprising at least one plastic and at least one elastomer has a density greater than about 1 g/cm$^3$. In one embodiment, a sintered polymeric material comprising at least one plastic and at least one elastomer has a density less than about 0.1 g/cm$^3$.

In some embodiments, a sintered polymeric material comprising at least one plastic and at least one elastomer has a rigidity according to ASTM D747 of less than about 15 pounds. ASTM D747 is entitled the Standard Test Method for Apparent Bending Modulus of Plastics by Means of a Cantilever Beam and is well suited for determining relative flexibility of materials over a wide range. In other embodiments, a sintered polymeric material comprising at least one plastic and at least one elastomer has a rigidity according to ASTM D747 of less than about 10 pounds. In a further embodiment, a sintered polymeric material comprising at least one plastic and at least on elastomer has a rigidity according to ASTM D747 of less than about 5 pounds. In another embodiment, a sintered polymeric material comprising at least one plastic and at least on elastomer has a rigidity according to ASTM D747 of less than about 1 pound.

Moreover, in some embodiments, a sintered porous polymeric material comprising at least one plastic and at least one elastomer has a tensile strength ranging from about 10 to about 5,000 psi as measured according to ASTM D638. A sintered porous polymeric material comprising at least one plastic and at least one elastomer, in some embodiments, has a tensile strength ranging from about 50 to 3000 psi or from about 100 to 1,000 psi as measured according to ASTM D638. In some embodiments, a sintered porous polymeric material comprising at least one plastic and at least one elastomer has an elongation from ranging from 10% to 500%.

Sintered polymeric materials comprising at least one plastic and at least one elastomer can have any desired shape or form such as blocks, tubes, cones, cylinders, sheets, or films. In one embodiment, for example, a sintered polymeric material comprising at least one plastic and at least one elastomer has the shape of a nib such as nibs used in writing instruments.

Continuous Sintered Polymeric Materials Comprising a Flexible Region and a Rigid Region In another embodiment, the present invention provides a sintered polymeric material comprising a flexible region continuous with a rigid region, wherein the flexible region comprises a first plastic and at least one elastomer, and the rigid region comprises a second plastic. In some embodiments, the first and second plastics comprise the same plastic. In other embodiments, the first and second plastics comprise different plastics.

A sintered polymeric material comprising a flexible region continuous with a rigid region, in some embodiments, can further comprise plastics in addition to the first and second plastics. In one embodiment, for example, the flexible region of a sintered polymeric material comprises one or more plastics in addition to the first plastic. Moreover, the rigid region, in some embodiments, comprises one or more plastics in addition to the second plastic. Plastics suitable for use in continuous sintered polymeric materials of the present invention, in some embodiments, are consistent with any of the plastics provided herein.

Elastomers suitable for use in continuous sintered polymeric materials of the present invention, in some embodiments, comprise elastomers consistent with those provided herein.

Properties of Continuous Sintered Polymeric Materials

In some embodiments, the flexible region of a continuous sintered polymeric material comprises at least one elastomer in an amount ranging from about 10 weight percent to about 90 weight percent. In other embodiments, the flexible region comprises at least one elastomer in an amount ranging from about 20 weight percent to about 80 weight percent. In another embodiment, the flexible region comprises at least one elastomer in an amount ranging from about 30 weight percent to about 70 weight percent. In a further embodiment, the flexible region comprises at least one elastomer in an amount ranging from about 40 weight percent to about 60 weight percent.

The flexible region of a continuous sintered polymeric material, according to some embodiments, is porous. In one embodiment, the flexible region comprising a first plastic and at least one elastomer has a porosity ranging from about 10% to about 90%. In another embodiment, the flexible region has a porosity ranging from about 20% to about 80% or from about 30% to about 70%. In a further embodiment, the flexible region has a porosity ranging from about 40% to about 60%.

In some embodiments, a flexible region of a continuous porous sintered polymeric material has an average pore size ranging from about 1 μm to about 200 μm. In other embodiments, a flexible region has an average pore size ranging from about 2 μm to about 150 μm, from about 5 μm to about 100 μm or from about 10 μm to about 50 μm. In another embodiment, a flexible region has an average pore size less than about 1 μm. In one embodiment, a flexible region has an average pore size ranging from about 0.1 μm to about 1 μm. In a further embodiment, a flexible region has an average pore size greater than 200 μm. In one embodiment, a flexible region has an average pore size ranging from about 200 μm to about 500 μm or from about 500 μm to about 1 mm.

The flexible region of a continuous sintered polymeric material, according to some embodiments, has a density ranging from about 0.1 g/cm$^3$ to about 1 g/cm$^3$. In other embodiments, the flexible region has a density ranging from about 0.2 g/cm$^3$ to about 0.8 g/cm$^3$ or from about 0.4 g/cm$^3$ to about 0.6 g/cm$^3$. In a further embodiment, the flexible region has a density greater than about 1 g/cm$^3$. In one embodiment, the flexible region has a density less than about 0.1 g/cm$^3$.

In some embodiments, the flexible region of a continuous sintered polymeric material has rigidity according to ASTM D747 of less than about 15 pounds. In other embodiments, the flexible region of a sintered polymeric material has a rigidity according to ASTM D747 of less than about 10 pounds. In another embodiment, the flexible region of a sintered polymeric material has a rigidity according to ASTM D747 of less than about 5 pounds. In another embodiment, a sintered polymeric material comprising at least one plastic and at least on elastomer has a rigidity according to ASTM D747 of less than about 1 pound.

The rigid region of a continuous sintered polymeric material, according embodiments of the present invention, comprises a second plastic. In some embodiments, the rigid region does not comprise any elastomeric materials in addition to the second plastic. In other embodiments, the rigid region comprises less than about 20 weight percent elastomer. In another embodiment, the rigid region comprises less than about 10 weight percent elastomer. In a further embodiment, the rigid region comprises less than about 5 weight percent elastomer.

In some embodiments, the rigid region is porous having a porosity ranging from about 10% to about 90%. In other embodiments, the rigid region has a porosity ranging from about 20% to about 80% or from about 30% to about 70%. In another embodiment, the rigid region has a porosity ranging from about 40% to about 60%.

In some embodiments, a rigid region of a continuous sintered polymeric material has an average pore size ranging from about 1 μm to about 200 μm. In other embodiments, a rigid region has an average pore size ranging from about 2 μm to about 150 μm, from about 5 μm to about 100 μm or from about 10 μm to about 50 μm. In another embodiment, a rigid region has an average pore size less than about 1 μm. In one embodiment, a rigid region has an average pore size ranging from about 0.1 μm to about 1 μm. In a further embodiment, a rigid region has an average pore size greater than 200 μm. In one embodiment, a rigid region has an average pore size ranging from about 200 μm to about 500 μm or from about 500 μm to about 1 mm.

The rigid region of a continuous sintered polymeric material, according to some embodiments, has a density ranging from about 0.1 g/cm$^3$ to about 1 g/cm$^3$. In other embodiments, the rigid region has a density ranging from about 0.2 g/cm$^3$ to about 0.8 g/cm$^3$ or from about 0.4 g/cm$^3$ to about 0.6 g/cm$^3$. In a further embodiment, the rigid region has a density greater than about 1 g/cm$^3$. In one embodiment, the rigid region has a density less than about 0.1 g/cm$^3$.

In some embodiments, the rigid region of a sintered polymeric material has rigidity according to ASTM D747 of greater than about 15 pounds. In other embodiments, the rigid region of a sintered polymeric material has a rigidity according to ASTM D747 of greater than about 10 pounds. In another embodiment, the rigid region of a sintered polymeric material has a rigidity according to ASTM D747 of greater than about 5 pounds.

Sintered polymeric materials comprising a flexible region continuous with a rigid region, wherein the flexible region comprises a first plastic and at least one elastomer, and the rigid region comprises a second plastic can have any desired shape or form including blocks, tubes, cones, cylinders, sheets, or films. In one embodiment, a sintered polymeric material comprising a flexible region continuous with a rigid region has the shape of a nib such as nibs used in writing instruments or other applicators.

Applicators Comprising Sintered Polymeric Materials

In another aspect, the present invention provides an applicator comprising a sintered polymeric material, the sintered polymeric material comprising at least one plastic and at least one elastomer as provided herein. In a further embodiment, the present invention provides an applicator comprising a continuous sintered polymeric material comprising a flexible region and a rigid region, the flexible region comprising a first plastic and at least one elastomer, and the rigid region comprising a second plastic as provided herein. In some embodiments, sintered polymeric materials of applicators of the present invention further comprise at least one color change indicator.

Figure 2:
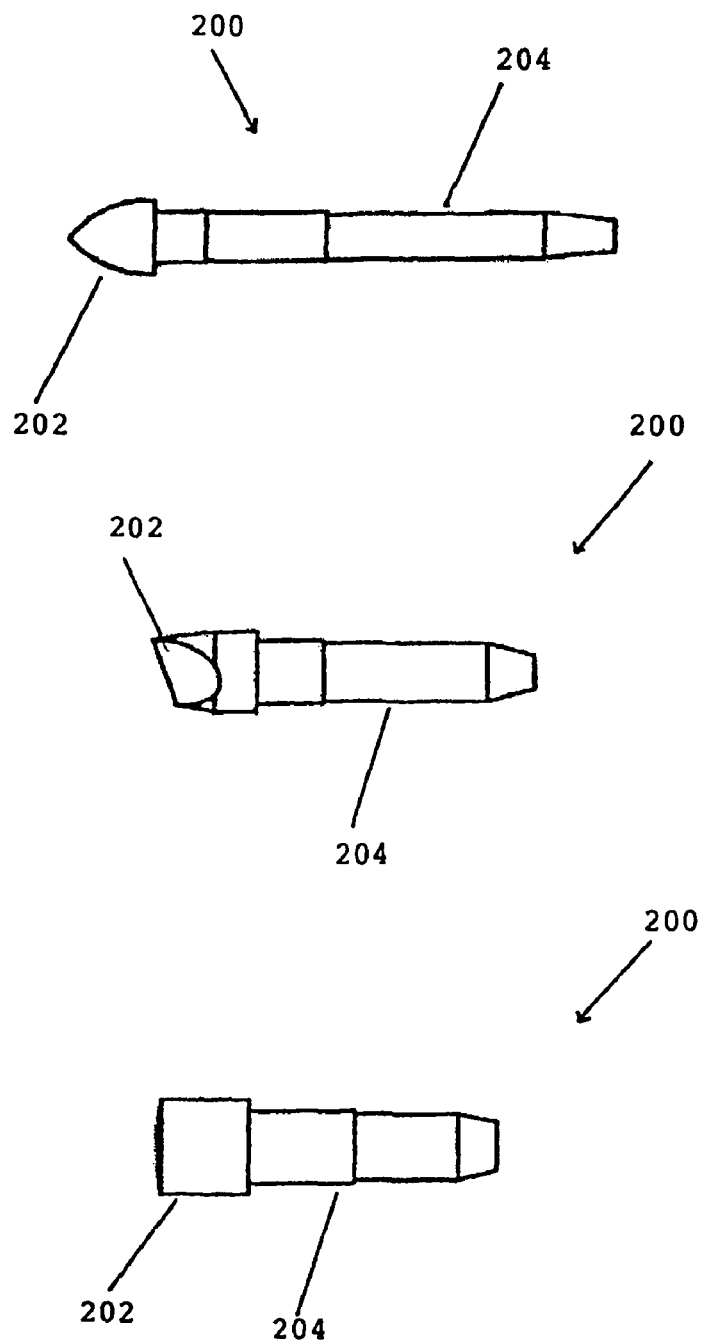
FIG. 2 illustrates various applicators according to embodiments of the present invention.

Applicators comprising sintered polymeric materials of the present invention can have any desired shape. FIG. 1 illustrates several applicators according to embodiments of the present invention. The applicators illustrated in FIG. 1 comprise a sintered polymeric material comprising at least one plastic and at least one elastomer. FIG. 2 additionally illustrates applicators according to embodiments of the present invention. The applicators (200) illustrated in FIG. 2 each comprise a flexible region (202) and a rigid region (204), the flexible region (202) comprising a first plastic and at least one elastomer, and the rigid region (204) comprising a second plastic. The flexible region (202) of an applicator (200), in some embodiments, is the tip for applying a composition to a surface. Moreover, in some embodiments, the rigid region (204) can serve as a point of attachment for attaching the applicator to a housing.

In some embodiments, applicators comprising sintered polymeric materials of the present invention further comprise a hollow longitudinal axis. The hollow longitudinal axis can facilitate attachment of the applicator to an apparatus such as a writing instrument. In one embodiment, for example, the hollow longitudinal axis of an applicator is operable to receive a shaft of a writing instrument, the shaft comprising ink. Attachment of the applicator to the ink shaft can allow ink to flow into the applicator for application of the ink to a writing surface.

Figure 3:
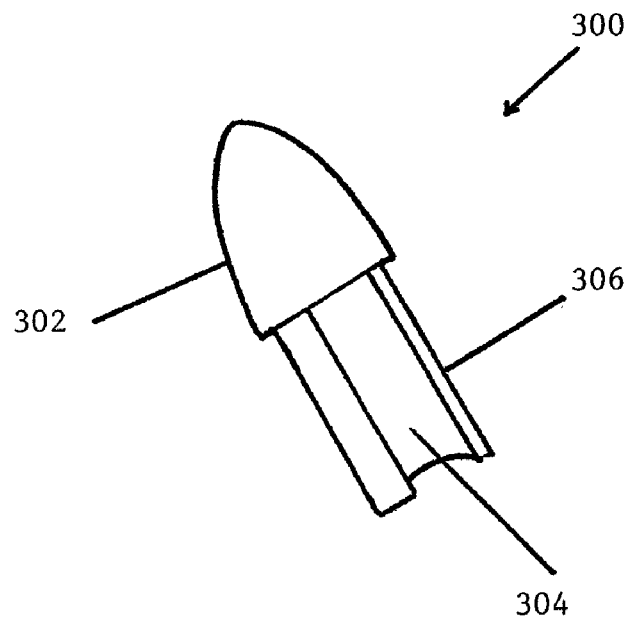
FIG. 3 illustrates an applicator according to one embodiment of the present invention.

FIG. 3 illustrates an applicator comprising a sintered polymeric material of the present invention having a hollow longitudinal axis according to one embodiment of the present invention. The applicator (300) comprises a solid tip (302) and a hollow longitudinal axis (304). The solid tip (302) comprises a flexible sintered polymeric material comprising a first plastic and at least one elastomer while the cylindrical region (306) defining the hollow longitudinal axis comprises a rigid second plastic. In some embodiments, the cylindrical region (306) can comprise a first plastic and at least one elastomer.

In another aspect, the present invention provides an applicator comprising a sintered porous polymeric component and a fibrous component coupled to the sintered porous polymeric component. In some embodiments, the applicator further comprises a reservoir coupled to the fibrous component. In other embodiments, the fibrous component serves as the reservoir.

Sintered Porous Polymeric Component

A sintered porous polymeric component of an applicator, in some embodiments, comprises at least one plastic. In other embodiments, a sintered porous polymeric component comprises a plurality of plastics. Plastics suitable for use in applicators comprising a sintered porous polymeric component and a fibrous component are consistent with any of the plastics provided herein. In one embodiment, a sintered porous polymeric component comprising at least one plastic does not comprise an elastomer.

In some embodiments, a sintered porous polymeric component comprising at least one plastic has a porosity ranging from about 10% to about 90%. In other embodiments, a sintered porous polymeric component has a porosity ranging from about 20% to about 80% or from about 30% to about 70%. In another embodiment, a sintered porous polymeric component comprising at least one plastic has a porosity ranging from about 40% to about 60%.

In some embodiments, a sintered porous polymeric component comprising at least one plastic has an average pore size ranging from about 1 µm to about 200 µm. In other embodiments, a sintered porous polymeric component has an average pore size ranging from about 2 µm to about 150 µm, from about 5 µm to about 100 µm, or from about 10 µm to about 50 µm. In another embodiment, a sintered porous polymeric component comprising at least one plastic has an average pore size ranging from about 0.1 µm to about 1 µm. In a further embodiment, a sintered porous polymeric component has an average pore size greater than about 200 µm. In one embodiment, a sintered porous polymeric component has an average pore size ranging from about 200 µm to about 500 µm or from about 500 µm to about 1 mm.

A sintered porous polymeric component comprising at least one plastic, according to some embodiments, has a density ranging from about 0.1 g/cm$^3$ to about 1 g/cm$^3$. In other embodiments, a sintered porous polymeric component has a density ranging from about 0.2 g/cm$^3$ to about 0.8 g/cm$^3$ or from about 0.4 g/cm$^3$ to about 0.6 g/cm$^3$. In a further embodiment, a sintered porous polymeric component has a density greater than about 1 g/cm$^3$. In one embodiment, a sintered porous polymeric component has density less than about 0.1 g/cm$^3$.

In some embodiments, a sintered porous polymeric component comprising at least one plastic has a rigidity according to ASTM D747 of greater than about 15 pounds. In other embodiments, a sintered porous polymeric component has a rigidity according to ASTM D747 of greater than 10 pounds. In another embodiment, the sintered porous polymeric component has a rigidity of according to ASTM D747 of greater than 5 pounds.

In some embodiments, a sintered porous polymeric component comprising at least one plastic further comprises at least one color change indicator. In some embodiments, a color change indicator comprises an organic or inorganic dye, including food grade dyes. Color change indicators comprising food grade dyes, according to embodiments of the present invention, are operable to be used with biological samples due to the non-toxic nature of the food dyes.

In some embodiments, a color change indicator comprises FD&C Blue No. 1, FD&C Blue No. 2, FD&C Green No. 3, FD&C Red No. 40, FD&C Red No. 3, FD&C Yellow No. 5, FD&C Yellow No. 6, Solvent Red 24, Solvent Red 26, Solvent Red 164, Solvent Yellow 124, Solvent Blue 35, or combinations thereof.

Color change indicators, according to some embodiments, demonstrate a pH dependency on the color produced. As a result, color change indicators, in some embodiments, indicate not only liquid contact with the sintered porous polymeric material of the applicator but the relative pH of the contacting liquid as well. Color change indicators demonstrating a pH dependency, in some embodiments, comprise methyl violet, eosin yellow, malachite green, thymol blue, methyl yellow, bromophenol blue, congo red, methyl orange, bromocresol green, methyl red, litmus, bromocresol purple, bromophenol red, bromothymol blue, phenol red, neutral red, naphtholphthalein, cresol red, phenolphthalein, thymolphthalein, alkali blue, Alizarin Yellow R, indigo carmine, epsilon blue, or combinations thereof.

In some embodiments, a sintered porous polymeric component comprises at least one color change indicator in an amount ranging from about 0.001 weight percent to about 2 weight percent. In other embodiments, a sintered porous polymeric component comprises at least one color change indicator in an amount ranging from about 0.01 weight percent to about 1 weight percent. In a further embodiment, a sintered porous component comprises at least one color change indicator in an amount ranging from about 0.05 weight percent to about 0.5 weight percent.

Sintered porous polymeric components comprising at least one plastic, according to some embodiments of the present invention, can have any desired shape or form such as blocks, tubes, cones, and cylinders. In some embodiments, for example, sintered porous polymeric components can display various nib shapes, such as those used in writing instruments.

In another aspect, a sintered porous polymeric component of an applicator, in some embodiments, comprises at least one plastic and at least one elastomer. Plastics and elastomers suitable for use in a sintered porous polymeric component, in some embodiments, are consistent with any of those described herein.

A sintered porous polymeric component comprising at least one plastic and at least one elastomer, according to some embodiments of the present invention, comprises at least one elastomer in an amount ranging from about 10 weight percent to about 90 weight percent. In other embodiments, a sintered porous polymeric component comprises at least one elastomer in an amount ranging from about 20 weight percent to about 80 weight percent. In another embodiment, a sintered porous polymeric component comprises at least one elastomer in an amount ranging from about 30 weight percent to about 70 weight percent. In a further embodiment, a sintered porous polymeric component comprises at least one elastomer in an amount ranging from about 40 weight percent to about 60 weight percent.

A sintered porous polymeric component comprising at least one plastic and at least one elastomer, in one embodiment, has a porosity ranging from about 10% to about 90%. In another embodiment, a sintered porous polymeric component comprising at least one plastic and at least one elastomer has a porosity ranging from about 20% to about 80% or from about 30% to about 70%. In a further embodiment, a sintered porous polymeric component comprising at least one plastic and at least one elastomer has a porosity ranging from about 40% to about 60%.

Sintered porous polymeric components comprising at least one plastic and at least one elastomer, according to some embodiments of the present invention, have an average pore size ranging from about from about 1 μm to about 200 μm. In other embodiments, sintered porous polymeric components comprising at least one plastic and at least one elastomer have an average pore size ranging from about 2 μm to about 150 μm, from about 5 μm to about 100 μm, or from about 10 μm to about 50 μm. In another embodiment, a sintered porous polymeric component has an average pore size less than about 1 μm. In one embodiment, a sintered porous polymeric component comprising at least one plastic and at least one elastomer has an average pore size ranging from about 0.1 μm to about 1 μm. In a further embodiment, a sintered porous polymeric component of the present invention has an average pore size greater than 200 μm. In one embodiment, a sintered porous polymeric component comprising at least one plastic and at least one elastomer has an average pore size ranging from about 200 μm to about 500 μm or from about 500 μm to about 1 mm.

Sintered porous polymeric components comprising at least one plastic and at least one elastomer, according to some embodiments, have a density ranging from about 0.1 g/cm³ to about 1 g/cm³. In other embodiments, a sintered porous polymeric component has a density ranging from about 0.2 g/cm³ to about 0.8 g/cm³ or from about 0.4 g/cm³ to about 0.6 g/cm³. In a further embodiment, a sintered porous polymeric component comprising at least one plastic and at least one elastomer has a density greater than about 1 g/cm³. In one embodiment, a sintered porous polymeric component comprising at least one plastic and at least one elastomer has a density less than about 0.1 g/cm³.

In some embodiments, a sintered porous polymeric component comprising at least one plastic and at least one elastomer has a rigidity according to ASTM D747 of less than about 15 pounds. In other embodiments, a sintered porous polymeric component comprising at least one plastic and at least one elastomer has a rigidity according to ASTM D747 of less than about 10 pounds. In a further embodiment, a sintered porous polymeric component comprising at least one plastic and at least on elastomer has a rigidity according to ASTM D747 of less than about 5 pounds. In another embodiment, a sintered porous polymeric component comprising at least one plastic and at least on elastomer has a rigidity according to ASTM D747 of less than about 1 pound.

Moreover, in some embodiments, a sintered porous polymeric component comprising at least one plastic and at least one elastomer has a tensile strength ranging from about 10 to about 5,000 psi as measured according to ASTM D638. A sintered porous polymeric component comprising at least one plastic and at least one elastomer, in some embodiments, has a tensile strength ranging from about 50 to 3000 psi or from about 100 to 1,000 psi as measured according to ASTM D638. In some embodiments, a sintered porous polymeric component comprising at least one plastic and at least one elastomer has an elongation from ranging from 10% to 500%.

In some embodiments, a sintered porous polymeric component comprising at least one plastic and at least one elastomer further comprises at least one color change indicator. Color change indicator suitable for use in sintered porous polymeric components comprising at least one plastic and at least one elastomer, in some embodiments, are consistent with any of those provided herein.

In some embodiments, a sintered porous polymeric component comprising at least one plastic and at least one elastomer comprises at least one color change indicator in an amount ranging from about 0.001 weight percent to about 2 weight percent. In other embodiments, a sintered porous polymeric component comprises at least one color change indicator in an amount ranging from about 0.01 weight percent to about 1 weight percent. In a further embodiment, a sintered porous polymeric component comprises at least one color change indicator in an amount ranging from about 0.05 weight percent to about 0.5 weight percent.

Sintered porous polymeric components comprising at least one plastic and at least one elastomer, according to embodiments of the present invention, can have any desired shape or form such as blocks, tubes, cones, and cylinders. In some embodiments, for example, sintered porous polymeric components comprising at least one plastic and at least one elastomer can display various nib shapes, such as those used in writing instruments.

In another aspect, a sintered porous polymeric component of an applicator, in some embodiments, comprises a flexible region continuous with a rigid region, wherein the flexible region comprises a first plastic and at least one elastomer and the rigid region comprises a second plastic.

In some embodiments, the first and second plastics comprise the same plastic. In other embodiments, the first and second plastics comprise different plastics. A sintered porous polymeric component comprising a flexible region continuous with a rigid region, in some embodiments, further comprises plastics in addition to the first and second plastics. In one embodiment, for example, the flexible region comprises one or more plastics in addition to the first plastic. Moreover, the rigid region, in some embodiments, comprises one or more plastics in addition to the second plastic. Plastics suitable for use in sintered polymeric materials comprising a flexible region continuous with a rigid region, in some embodiments, are consistent with any of the plastics provided herein.

Elastomers suitable for use in sintered porous polymeric materials comprising a flexible region continuous with a rigid region, in some embodiments, comprise elastomers consistent with those provided herein.

In some embodiments, the flexible region comprises at least one elastomer in an amount ranging from about 10 weight percent to about 90 weight percent. In other embodiments, the flexible region comprises at least one elastomer in an amount ranging from about 20 weight percent to about 80 weight percent. In another embodiment, the flexible region comprises at least one elastomer in an amount ranging from about 30 weight percent to about 70 weight percent. In a further embodiment, the flexible region comprises at least one elastomer in an amount ranging from about 40 weight percent to about 60 weight percent.

In some embodiments, the flexible region comprising a first plastic and at least one elastomer has a porosity ranging from about 10% to about 90%. In another embodiment, the flexible region has a porosity ranging from about 20% to about 80% or from about 30% to about 70%. In a further embodiment, the flexible region has a porosity ranging from about 40% to about 60%.

In some embodiments, the flexible region has an average pore size ranging from about 1 µm to about 200 µm. In other embodiments, the flexible region has an average pore size ranging from about 2 µm to about 150 µm, from about 5 µm to about 100 µm or from about 10 µm to about 50 µm. In another embodiment, the flexible region has an average pore size less than about 1 µm. In one embodiment, the flexible region has an average pore size ranging from about 0.1 µm to about 1 µm. In a further embodiment, the flexible region has an average pore size greater than 200 µm. In one embodiment, the flexible region has an average pore size ranging from about 200 µm to about 500 µm or from about 500 µm to about 1 mm.

The flexible region of a continuous sintered porous polymeric component, according to some embodiments, has a density ranging from about 0.1 g/cm$^3$ to about 1 g/cm$^3$. In other embodiments, the flexible region has a density ranging from about 0.2 g/cm$^3$ to about 0.8 g/cm$^3$ or from about 0.4 g/cm$^3$ to about 0.6 g/cm$^3$. In a further embodiment, the flexible region has a density greater than about 1 g/cm$^3$. In one embodiment, the flexible region has a density less than about 0.1 g/cm$^3$.

In some embodiments, the flexible region of a has rigidity according to ASTM D747 of less than about 15 pounds. In other embodiments, the flexible region has a rigidity according to ASTM D747 of less than about 10 pounds. In another embodiment, the flexible region has a rigidity according to ASTM D747 of less than about 5 pounds. In a further embodiment, the flexible region has a rigidity according to ASTM D747 of less than about 1 pound.

The rigid region continuous with the flexible region of a sintered porous polymeric component, according embodiments of the present invention, comprises a second plastic. In some embodiments, the rigid region does not comprise any elastomeric materials in addition to the second plastic. In other embodiments, the rigid region comprises less than about 20 weight percent elastomer. In another embodiment, the rigid region comprises less than about 10 weight percent elastomer. In a further embodiment, the rigid region comprises less than about 5 weight percent elastomer.

In some embodiments, the rigid region has a porosity ranging from about 10% to about 90%. In other embodiments, the rigid region has a porosity ranging from about 20% to about 80% or from about 30% to about 70%. In another embodiment, the rigid region has a porosity ranging from about 40% to about 60%.

In some embodiments, the rigid region has an average pore size ranging from about 1 µm to about 200 µm. In other embodiments, the rigid region has an average pore size ranging from about 2 µm to about 150 µm, from about 5 µm to about 100 µm or from about 10 µm to about 50 µm. In another embodiment, the rigid region has an average pore size less than about 1 µm. In one embodiment, the rigid region has an average pore size ranging from about 0.1 µm to about 1 µm. In a further embodiment, the rigid region has an average pore size greater than 200 µm. In one embodiment, the rigid region has an average pore size ranging from about 200 µm to about 500 µm or from about 500 µm to about 1 mm.

The rigid region of a sintered porous polymeric component, according to some embodiments, has a density ranging from about 0.1 g/cm$^3$ to about 1 g/cm$^3$. In other embodiments, the rigid region has a density ranging from about 0.2 g/cm$^3$ to about 0.8 g/cm$^3$ or from about 0.4 g/cm$^3$ to about 0.6 g/cm$^3$. In another embodiment, the rigid region has a density greater than about 1 g/cm$^3$. In one embodiment, the rigid region has a density less than about 0.1 g/cm$^3$.

In some embodiments, the rigid region of a sintered porous polymeric component has rigidity according to ASTM D747 of greater than about 15 pounds. In other embodiments, the rigid region has a rigidity according to ASTM D747 of greater than about 10 pounds. In another embodiment, the rigid region has a rigidity according to ASTM D747 of greater than about 5 pounds.

In some embodiments, the flexible region and/or rigid region of a sintered porous polymeric component further comprises at least one color change indicator. In one embodiment, the flexible region can comprises a first color change indicator and the rigid region can comprise a second color change indicator. In some embodiments, the first and second color change indicators are the same. In other embodiments, the first and second color change indicators are different. Color change indicators suitable for use in flexible and rigid regions of sintered porous polymeric components, in some embodiments, are consistent with any of the color change indicators described herein.

In some embodiments, a flexible and/or rigid region of sintered porous polymeric component comprises at least one color change indicator in an amount ranging from about 0.001 weight percent to about 2 weight percent. In other embodiments, a flexible and/or rigid region of a sintered porous polymeric component comprises at least one color change indicator in an amount ranging from about 0.01 weight percent to about 1 weight percent. In a further embodiment, a flexible and/or rigid region of a sintered porous polymeric component comprises at least one color change indicator in an amount ranging from about 0.05 weight percent to about 0.5 weight percent.

Sintered porous polymeric components comprising a flexible region continuous with a rigid region, according to embodiments of the present invention, can have any desired shape or form such as blocks, tubes, cones, and cylinders. In some embodiments, for example, sintered porous polymeric components can display various nib shapes, such as those used in marking and writing instruments.

Fibrous Component

In addition to the various sintered porous polymeric components, an applicator of the present invention comprises a fibrous component. In some embodiments, a fibrous component comprises a plurality of polyester fibers, polyacrylic fibers, or combinations thereof. In some embodiments, a fibrous component comprises a plurality of bicomponent fibers. Bicomponent fibers, in some embodiments, comprise fibers constructed from the following pairs of polymers: polypropylene/polyethylene terephthalate (PET), polyethylene/PET, polypropylene/Nylon-6, Nylon-6/PET, copolyester/PET, copolyester/Nylon-6, copolyester/Nylon-6,6, poly-4-methyl-1-pentene/PET, poly-4-methyl-1-pentene/Nylon-6, poly-4-methyl-1-pentene/Nylon-6,6, PET/polyethylene naphthalate (PEN), Nylon-6,6/poly-1,4-cyclohexanedimethyl-1 (PCT), polypropylene/polybutylene terephthalate (PBT), Nylon-6/co-polyamide, polylactic acid/polystyrene, polyurethane/acetal, and soluble copolyester/polyethylene.

In another embodiment, a fibrous component comprises a plurality of monocomponent fibers including polyethylene fibers, polypropylene fibers, polystyrene fibers, nylon-6 fibers, nylon-6,6 fibers, nylon-12 fibers, copolyamide fibers, PET fibers, PBT fibers, CoPET fibers, and combinations thereof. In a further embodiment, a fibrous component can comprise any type or combination of fiber known to one of skill in the art useful in applicators including writing and marking instruments, cosmetic applicators, and medicament applicators.

In some embodiments, the fibrous component has a density ranging from about 0.1 g/cm$^3$ to about 1 g/cm$^3$. In other embodiments, a fibrous component of the present invention has a density ranging from about 0.2 g/cm$^3$ to about 0.8 g/cm$^3$ or from about 0.4 g/cm$^3$ to about 0.6 g/cm$^3$. In a further embodiment, a fibrous component has a density greater than about 1 g/cm$^3$. In one embodiment, the fibrous component has a density less than about 0.1 g/cm$^3$.

Fibrous components, according to embodiments of the present invention, can have any desired shape or form. In some embodiments, the fibrous component comprises a cylinder or shaft. In one embodiment, the fibrous component comprises a hollow cylinder or shaft. In another embodiment, the fibrous component comprises a solid cylinder or shaft.

Fibrous components, in some embodiments, further comprise a resin such as a thermoplastic and/or thermoset resin. Resins suitable for use in fibrous components of the present invention, in one embodiment, comprise phenolic resins, melamine resins, polyester resins, or combinations thereof. In some embodiments, the fibrous component is impregnated with one or more resins.

Fibrous components, according to embodiments of the present invention, can demonstrate densities, porosities, and wicking characteristics advantageous for the flow of compositions along and through the fibrous components. Fibrous components, in some embodiments, display advantageous flow characteristics of hydrophilic compositions. Fibrous components, in other embodiments, display advantageous flow characteristics of hydrophobic compositions. Fibrous components, in one embodiment, for example, display advantageous flow characteristics of ink and/or pigment compositions.

In embodiments of applicators of the present invention, the fibrous component is coupled to the sintered porous polymeric component. In some embodiments, the sintered porous polymeric component comprises a hollow longitudinal portion or internal slot operable to receive the fibrous component. In other embodiments, the fibrous component comprises a hollow longitudinal portion or an internal slot operable to receive the sintered porous polymeric component.

Figure 4:
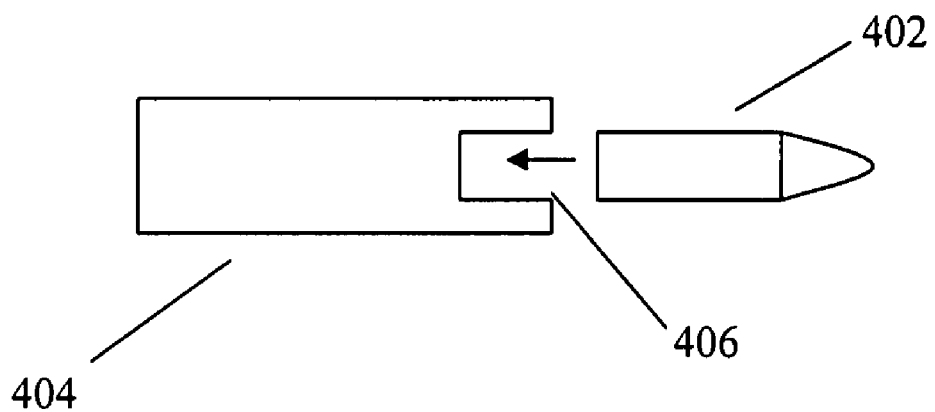
FIG. 4 illustrates a fibrous component coupled to a sintered porous polymeric component according to one embodiment of the present invention.

FIG. 4 illustrates a fibrous component coupled to a sintered porous polymeric component according to one embodiment of the present invention. As illustrated in FIG. 4, the sintered porous polymeric component (402) is disposed in an internal slot (406) of the fibrous component (404).

In some embodiments, coupling a fibrous component to a sintered porous polymeric component provides additional support to the sintered porous polymeric component allowing the use of sintered porous polymeric components having lengths greater than about 3 cm and diameters greater than about 5 mm. Moreover, the additional support provided by the fibrous component, in some embodiments, increases the durability of the sintered porous polymeric component thereby limiting breakage and other degradation pathways of the sintered porous polymeric component.

Reservoirs

In some embodiments, an applicator of the present invention further comprises a reservoir. Reservoirs, according to embodiments of the present invention, store or contain compositions to be delivered to the sintered porous polymeric component for application to a surface. In some embodiments, reservoirs contain or store inks, dyes, pigments, paints, and/or other coating compositions. In other embodiments, reservoirs contain or store cosmetic compositions. In a further embodiment, reservoirs contain or store medicament and/or pharmaceutical compositions.

In some embodiments, reservoirs comprise structures having an open volume or hollow region for containing compositions to be delivered to the sintered porous polymeric component for application to a surface. In one embodiment, for example, a reservoir comprises a hollow cylinder or cone. Reservoirs having an open volume, according to embodiments of the present invention, can have any desired volume. In some embodiments, a reservoir has a volume of at least about 1 ml. In other embodiments, a reservoir has a volume of at least about 5 ml or at least about 10 ml. In a further embodiment, a reservoir has a volume less than about 1 ml.

In some embodiments of the present invention, reservoirs comprise fibers and related materials. In other embodiments, reservoirs comprise polymeric foams, such as a polyurethane foam.

In some embodiments, the reservoir is coupled to the fibrous component. In other embodiments, the reservoir is coupled directly to the sintered porous polymeric component. In some embodiments wherein the reservoir is coupled directly to the sintered porous polymeric component, the reservoir is the fibrous component. In other embodiments wherein the reservoir is coupled directly to the sintered porous polymeric component, the applicator does not comprise a fibrous component.

Figure 5:
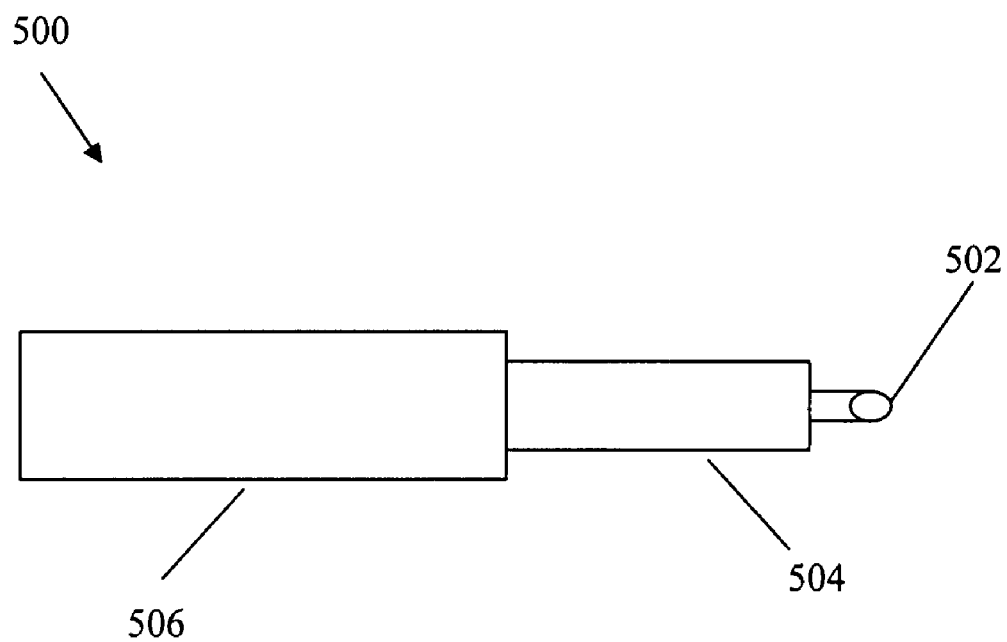
FIG. 5 illustrates an applicator according to one embodiment of the present invention.

FIG. 5 illustrates an applicator according to one embodiment of the present invention. As illustrated in FIG. 5, the applicator (500) comprises a sintered porous polymeric component (502) coupled to a fibrous component (504). The sintered porous polymeric component (502) is disposed within a hollow longitudinal portion or an internal slot of the fibrous component (504). A reservoir (506) is coupled to the fibrous component (504).

Applicator Housings

In some embodiments, an applicator of the present invention further comprises a housing in which the sintered porous polymeric component, fibrous component, and/or reservoir can be fully or partially disposed. Housings, according to embodiments of the present invention, can comprise any desired shape including cylinders, cones, and blocks. In some embodiments, housings comprise multiple pieces. In one embodiment, for example, a housing comprises a first cylinder in which the fibrous component and reservoir are disposed and a second cylinder in which the sintered porous polymeric material is disposed, wherein the first and second cylinders are operable to engage one another. The second cylinder can be disengaged from the first cylinder to expose the sintered porous polymeric material for applying a composition to a surface. In some embodiments, the first and second cylinders engage one another by a friction fit. In other embodiments, the first and second cylinders engage one another by a threading mechanism.

In some embodiments, the densities, pore sizes, and/or porosities of the sintered porous polymeric component, the fibrous component, and/or reservoir can be varied to promote advantageous flow characteristics of a composition to be delivered to a surface. In some embodiments, a density gradient can be established along the components of the applicator to increase the flow of a composition to the continuous sintered porous polymeric component. In one embodiment, for example, the fibrous component comprises a first density, the rigid region of the sintered porous polymeric material comprises a second density, and the flexible region of the sintered porous polymeric material comprises a third density, the first density being greater than the second density and the second density being greater than the third density. Embodiments of the present invention contemplate any variation of densities, pore sizes, and porosities of the individual components of applicators described herein to increase or inhibit the flow of a composition through the applicator.

In some embodiments, applicators of the present invention can be used in writing instruments such as pens and highlighters. In other embodiments, applicators of the present invention can be used in art utensils, including but not limited to, brushes, calligraphy pens, and markers. Applicators of the present invention, in some embodiments, can demonstrate desirable flow properties of inks and other writing media while providing enhanced flexibility and durability. In another embodiment, applicators comprising sintered polymeric materials of the present invention can be used to apply cosmetics. In a further embodiment, applicators of the present invention can be used in the medical field for the application of medicaments and other pharmaceutical species to surfaces, such as biological surfaces. In one embodiment, applicators of the present invention can be used in applying coatings to industrial surfaces.

Methods of Producing Sintered Polymeric Materials and Applicators Comprising the Same Methods of Producing Sintered Polymeric Materials In another aspect, the present invention provides methods of producing polymeric materials. In one embodiment, a method for producing a polymeric material comprises providing particles of at least one plastic, providing particles of at least one elastomer, and sintering the plastic particles and elastomer particles.

In some embodiments, particles of at least one plastic and particles of at least one elastomer are mixed in a desired ratio (weight percent) to produce a substantially uniform mixture. The uniform mixture of plastic and elastomer particles are disposed in a mold and sintered. The shape of the mold can be any desired shape allowing for the facile and single-step production of applicators such as writing instrument nibs according to embodiments of the present invention.

Plastic and elastomer particles, in some embodiments, have average sizes ranging from about 1 μm to about 1 mm. In another embodiment, plastic and elastomer particles have average sizes ranging from about 10 μm to about 900 μm, from about 50 μm to about 500 μm, or from about 100 μm to about 400 μm. In a further embodiment, plastic and elastomer particles have average sizes ranging from about 200 μm to about 300 μm. In some embodiments, plastic and elastomer particles have average sizes less than about 1 μm or greater than about 1 mm.

Sizes of plastic and elastomer particles, in some embodiments, are selected independently. In one embodiment, for example, the plastic particles have an average size greater than the elastomer particles. In another embodiment, plastic particles have an average size smaller than the elastomer particles. In a further embodiment, plastic and elastomer particles have about the same average size.

Plastic and elastomer particles, in some embodiments, are sintered at a temperature ranging from about 200° F. to about 700° F. In some embodiments, plastic and elastomer particles are sintered at a temperature ranging from about 300° F. to about 500° F. The sintering temperature, according to embodiments of the present invention, is dependent upon and selected according to the identity of the plastic and elastomer particles.

Plastic and elastomer particles, in some embodiments, are sintered for a time period ranging from about 30 seconds to about 30 minutes. In other embodiments, plastic and elastomer particles are sintered for a time period ranging from about 1 minute to about 15 minutes or from about 5 minutes to about 10 minutes. In some embodiments, the sintering process comprises heating, soaking, and/or cooking cycles. Moreover, in some embodiments, sintering of plastic and elastomer particles is conducted under ambient pressure (1 atm). In other embodiments sintering of plastic and elastomer particles is conducted under pressures greater than ambient pressure.

In another embodiment, a method for producing a polymeric material comprises disposing particles of a first plastic mixed with particles of at least one elastomer in a first part of a mold, disposing particles of a second plastic in a second part of the mold adjacent to the first part of the mold, and sintering the first plastic particles, second plastic particles and elastomer particles.

In one embodiment, for example, particles of a first plastic are mixed with particles of at least one elastomer in a desired ratio (weight percent) to produce a substantially uniform mixture. The mixture is disposed in the bottom half of a mold. Particles of a second plastic are disposed in the top half of the mold adjacent to the mixture of particles of the first plastic and at least one elastomer. The particles of the first plastic, second plastic, and elastomer particles are subsequently sintered to produce a polymeric material of the present invention.

In other embodiments, particles of a second plastic are disposed in the bottom half of a mold. The mixture of elastomer and first plastic particles are disposed in the top half of the mold adjacent to the second plastic particles. The particles of the first plastic, second plastic, and elastomer particles are subsequently sintered to produce a polymeric material of the present invention.

First plastic, second plastic, and elastomer particles, in some embodiments, have average sizes ranging from about 1 μm to about 1 mm. In another embodiment, first plastic, second plastic, and elastomer particles have average sizes ranging from about 10 μm to about 900 μm, from about 50 μm to about 500 μm, or from about 100 μm to about 400 μm. In a further embodiment, first plastic, second plastic, and elastomer particles have average sizes ranging from about 200 μm to about 300 μm. In some embodiments, first plastic, second plastic, and elastomer particles have average sizes less than about 1 μm or greater than about 1 mm. Sizes of first plastic, second plastic, and elastomer particles, in some embodiments, are selected independently.

First plastic, second plastic, and elastomer particles, in some embodiments, are sintered at a temperature ranging from about 200° F. to about 700° F. In some embodiments, first plastic, second plastic, and elastomer particles are sintered at a temperature ranging from about 300° F. to about 500° F. The sintering temperature, according to embodiments of the present invention, is dependent upon and selected according to the identity of the first plastic, second plastic and elastomer particles.

First plastic, second plastic, and elastomer particles, in some embodiments, are sintered for a time period ranging from about 30 seconds to about 30 minutes. In other embodiments, first plastic, second plastic, and elastomer particles are sintered for a time period ranging from about 1 minute to about 15 minutes or from about 5 minutes to about 10 minutes. In some embodiments, the sintering process comprises heating, soaking, and/or cooking cycles. Moreover, in some embodiments, sintering of first plastic, second plastic, and elastomer particles is conducted under ambient pressure (1 atm). In other embodiments sintering of first plastic, second plastic, and elastomer particles is conducted under pressures greater than ambient pressure.

A polymeric material produced by sintering particles of a first plastic, a second plastic, and at least one elastomer, in embodiments of the present invention, can comprise a flexible region continuous with a rigid region, the flexible region comprising the first plastic and the at least one elastomer, and the rigid region comprising the second plastic. The shape of the mold can be any desired shape allowing for the facile and single-step production of applicators such as writing instrument nibs.

Methods of Producing Applicators

In one embodiment, a method of producing an applicator comprises providing particles of at least one plastic, providing particles of at least one elastomer, and sintering the plastic particles and the elastomer particles.

In another aspect, a method of producing an applicator comprises providing a sintered porous polymeric component, providing a fibrous component, and coupling the fibrous component to the sintered porous polymeric component. Providing a sintered porous polymeric component, according to some embodiments, comprises providing particles of at least one plastic and sintering the plastic particles. In other embodiments, providing a sintered porous polymeric component comprises providing a particles of a plurality of plastics and sintering the plastic particles.

Plastic particles, in some embodiments, have average sizes ranging from about 1 µm to about 1 mm. In another embodiment, plastic particles have average sizes ranging from about 10 µm to about 900 µm, from about 50 µm to about 500 µm, or from about 100 µm to about 400 µm. In a further embodiment, plastic particles have average sizes ranging from about 200 µm to about 300 µm. In some embodiments, plastic particles have average sizes less than about 1 µm or greater than about 1 mm.

Plastic particles, in some embodiments, are sintered at a temperature ranging from about 200° F. to about 700° F. In some embodiments, plastic particles are sintered at a temperature ranging from about 300° F. to about 500° F. The sintering temperature, according to embodiments of the present invention, is dependent upon and selected according to the identity of the plastic particles.

Plastic particles, in some embodiments, are sintered for a time period ranging from about 30 seconds to about 30 minutes. In other embodiments, plastic particles are sintered for a time period ranging from about 1 minute to about 15 minutes or from about 5 minutes to about 10 minutes. In some embodiments, the sintering process comprises heating, soaking, and/or cooking cycles. Moreover, in some embodiments, sintering of plastic particles is conducted under ambient pressure (1 atm). In other embodiments sintering of plastic particles is conducted under pressures greater than ambient pressure.

In some embodiments, particles of at least one color change indicator are mixed in a desired weight ratio (weight percent) with the plastic and particles. Particles of a color change indicator, according to some embodiments, have average sizes ranging from about 1 µm to about 500 µm or from about 10 µm to about 400 µm. In another embodiment, particles of a color change indicator have average sizes ranging from about 50 µm to about 300 µm. In a further embodiment, particles of a color change indicator have average sizes ranging from about 100 µm to about 200 µm. In some embodiments, particles of a color change indicator have average sizes less than about 1 µm or greater than about 500 µm. Subsequent to mixing, the plastic and color change indicator particles are sintered according to the temperatures and time periods described herein.

In some embodiments, coupling the fibrous component to the sintered porous polymeric component comprises inserting the fibrous component into the sintered porous polymeric component. In some embodiments, the fibrous component is inserted into a hollow longitudinal portion or an internal slot of the sintered porous polymeric component. In other embodiments, coupling the fibrous component to the sintered porous polymeric component comprises inserting the sintered porous polymeric component into the fibrous component. In some embodiments, the sintered porous polymeric component is inserted into a hollow longitudinal portion or an internal slot of the fibrous component.

In another embodiment, a method for producing an applicator comprises providing a sintered polymeric component comprising at least one plastic and at least one elastomer, providing a fibrous component, and coupling the fibrous component to the sintered porous polymeric component. Providing a sintered porous polymeric component, in some embodiments, comprises providing particles of at least one plastic, providing particles of at least one elastomer, and sintering the plastic and elastomer particles.

In some embodiments, particles of at least one plastic and particles of at least one elastomer are mixed in a desired ratio (weight percent) to produce a substantially uniform mixture. The uniform mixture of plastic and elastomer particles are disposed in a mold and sintered. The shape of the mold can be any desired shape, such as disks, tubes, cones, and/or tapered shapes such as frustroconical shapes, allowing for the facile and single-step production of the sintered porous polymeric component.

Plastic and elastomer particles, in some embodiments, have average sizes ranging from about 1 µm to about 1 mm. In another embodiment, plastic and elastomer particles have average sizes ranging from about 10 µm to about 900 µm, from about 50 µm to about 500 µm, or from about 100 µm to about 400 µm. In a further embodiment, plastic and elastomer particles have average sizes ranging from about 200 µm to about 300 µm. In some embodiments, plastic and elastomer particles have average sizes less than about 1 µm or greater than about 1 mm.

Sizes of plastic and elastomer particles, in some embodiments, are selected independently. In one embodiment, for example, the plastic particles have an average size greater than the elastomer particles. In another embodiment, plastic particles have an average size smaller than the elastomer particles. In a further embodiment, plastic and elastomer particles have about the same average size.

Plastic and elastomer particles, in some embodiments, are sintered at a temperature ranging from about 200° F. to about 700° F. In some embodiments, plastic and elastomer particles are sintered at a temperature ranging from about 300° F. to about 500° F. The sintering temperature, according to embodiments of the present invention, is dependent upon and selected according to the identity of the plastic and elastomer particles.

Plastic and elastomer particles, in some embodiments, are sintered for a time period ranging from about 30 seconds to about 30 minutes. In other embodiments, plastic and elastomer particles are sintered for a time period ranging from about 1 minute to about 15 minutes or from about 5 minutes to about 10 minutes. In some embodiments, the sintering process comprises heating, soaking, and/or cooking cycles. Moreover, in some embodiments, sintering of plastic and elastomer particles is conducted under ambient pressure (1 atm). In other embodiments sintering of plastic and elastomer particles is conducted under pressures greater than ambient pressure.

In some embodiments, particles of at least one color change indicator are mixed in a desired weight ratio (weight percent) with the plastic and elastomer particles. Particles of a color change indicator, according to some embodiments, have average sizes ranging from about 1 µm to about 500 µm or from about 10 µm to about 400 µm. In another embodiment, particles of a color change indicator have average sizes ranging from about 50 µm to about 300 µm. In a further embodiment, particles of a color change indicator have average sizes ranging from about 100 µm to about 200 µm. In some embodiments, particles of a color change indicator have average sizes less than about 1 µm or greater than about 500 µm. Subsequent to mixing, the plastic, elastomer, and color change indicator particles are sintered according to the temperatures and time periods described herein.

In some embodiments, coupling the fibrous component to the sintered porous polymeric component comprising at least one plastic and at least one elastomer comprises inserting the fibrous component into the sintered porous polymeric component. In some embodiments, the fibrous component is inserted into a hollow longitudinal portion or an internal slot of the sintered porous polymeric component comprising at least one plastic and at least one elastomer. In other embodiments, coupling the fibrous component to the sintered porous polymeric component comprises inserting the sintered porous polymeric component into the fibrous component. In some embodiments, the sintered porous polymeric component is inserted into a hollow longitudinal portion or an internal slot of the fibrous component.

In another embodiment, a method for producing an applicator comprises providing a sintered porous polymeric component comprising a flexible region continuous with a rigid region, providing a fibrous component, and coupling the fibrous component to the sintered porous polymeric component. In some embodiments, the flexible region of the sintered porous polymeric component comprises a first plastic and at least one elastomer, and the rigid region comprises a second plastic.

In some embodiments, providing a sintered porous polymeric component comprising a flexible region continuous with a rigid region comprises disposing particles of a first plastic mixed with particles of at least one elastomer in a first part of a mold, disposing particles of a second plastic in a second part of the mold adjacent to the first part of the mold, and sintering the first plastic particles, the second plastic particles, and the elastomer particles.

In one embodiment, particles of a first plastic are mixed with particles of at least one elastomer in a desired ratio (weight percent) to produce a substantially uniform mixture. The mixture is disposed in a first part of a mold. Particles of a second plastic are disposed in a second part of the mold adjacent to the mixture of particles of the first plastic and at least one elastomer. The particles of the first plastic, second plastic, and elastomer particles are subsequently sintered to produce a sintered porous polymeric material of the present invention.

First plastic, second plastic, and elastomer particles, in some embodiments, have average sizes ranging from about 1 µm to about 1 mm. In another embodiment, first plastic, second plastic, and elastomer particles have average sizes ranging from about 10 µm to about 900 µm, from about 50 µm to about 500 µm, or from about 100 µm to about 400 µm. In a further embodiment, first plastic, second plastic, and elastomer particles have average sizes ranging from about 200 µm to about 300 µm. In some embodiments, first plastic, second plastic, and elastomer particles have average sizes less than about 1 µm or greater than about 1 mm. Sizes of first plastic, second plastic, and elastomer particles, in some embodiments, are selected independently.

First plastic, second plastic, and elastomer particles, in some embodiments, are sintered at a temperature ranging from about 200° F. to about 700° F. In some embodiments, first plastic, second plastic, and elastomer particles are sintered at a temperature ranging from about 300° F. to about 500° F. The sintering temperature, according to embodiments of the present invention, is dependent upon and selected according to the identity of the first plastic, second plastic and elastomer particles.

First plastic, second plastic, and elastomer particles, in some embodiments, are sintered for a time period ranging from about 30 seconds to about 30 minutes. In other embodiments, first plastic, second plastic, and elastomer particles are sintered for a time period ranging from about 1 minute to about 15 minutes or from about 5 minutes to about 10 minutes. In some embodiments, the sintering process comprises heating, soaking, and/or cooking cycles. Moreover, in some embodiments, sintering of first plastic, second plastic, and elastomer particles is conducted under ambient pressure (1 atm). In other embodiments sintering of first plastic, second plastic, and elastomer particles is conducted under pressures greater than ambient pressure.

In some embodiments, particles of at least one color change indicator are added in a desired weight ratio (weight percent) to the first plastic, second plastic, and/or elastomer particles. Particles of a color change indicator, according to some embodiments, have average sizes ranging from about 1 µm to about 500 µm or from about 10 µm to about 400 µm. In another embodiment, particles of a color change indicator have average sizes ranging from about 50 µm to about 300 µm. In a further embodiment, particles of a color change indicator have average sizes ranging from about 100 µm to about 200 µm. In some embodiments, particles of a color change indicator have average sizes less than about 1 µm or greater than about 500 µm. Subsequent to mixing, the first plastic, second plastic, elastomer and color change indicator particles are sintered according to the temperatures and time periods described herein.

In some embodiments, coupling the fibrous component to the sintered porous polymeric component comprises inserting the fibrous component into the continuous sintered porous polymeric component. In some embodiments, the fibrous component is inserted into a hollow longitudinal portion or an internal slot of the sintered porous polymeric component. In some embodiments, the rigid region of the sintered porous polymeric component comprises the hollow longitudinal portion or internal slot.

In other embodiments, coupling the fibrous component to the sintered porous polymeric component comprises inserting the sintered porous polymeric component into the fibrous component. In some embodiments, the continuous sintered porous polymeric component is inserted into a hollow longitudinal portion or internal slot of the fibrous component. In some embodiments, the rigid region of the continuous sintered porous polymeric material is inserted into the hollow longitudinal portion or internal slot of the fibrous component.

Methods of Applying a Composition to a Surface

In a further aspect, the present invention provides methods of applying a composition to a surface. In one embodiment, a method for applying a composition to a surface comprises providing an applicator comprising a sintered polymeric material comprising at least one plastic and at least one elastomer, disposing at least a portion of the composition on the applicator, and contacting the surface with the composition on the applicator. In another embodiment, a method of applying a composition to a surface comprises providing an applicator comprising a sintered polymeric material comprising a flexible region continuous with a rigid region, the flexible region comprising a first plastic and at least one elastomer, and the rigid region comprising a second plastic, disposing at least a portion of the composition on the applicator, and contacting the surface with the composition on the applicator.

In another embodiment, a method for applying a composition to a surface comprises providing an applicator comprising a sintered porous polymeric component and a fibrous component coupled to the sintered porous polymeric component, disposing at least a portion of a composition on the applicator, and contacting a surface with the composition on the applicator. In some embodiments, the sintered porous polymeric component comprises at least one plastic and at least one elastomer. In other embodiments, the sintered porous polymeric component comprises a continuous material comprising a flexible region and a rigid region, the flexible region comprising a first plastic and at least one elastomer, and the rigid region comprising a second plastic.

In some embodiments of applying a composition to a surface, disposing at least a portion of a composition on the applicator comprises passing the composition through the fibrous component to an exterior surface of the sintered porous polymeric component.

A surface, in some embodiments, comprises a writing or painting surface, such as paper, parchment, and canvas. In other embodiments, a surface comprises a biological surface, such as skin or hair or a site of injury such as a laceration. In a further embodiment, a surface comprises a site of a topical disease or condition, such as a site of affected skin.

In some embodiments of methods of applying a composition to a surface wherein the sintered polymeric material of the applicator comprises a color change indicator, the color of the sintered polymeric material can change when a composition is disposed thereon for application to a surface. The color change of the sintered polymeric material can indicate to a user that a composition is present on the applicator and ready for subsequent application to a surface.

Filtration Media and Barrier Media Comprising Porous Sintered Polymeric Materials The present invention additionally provides filtration and barrier media comprising sintered porous polymeric materials of the present invention and methods of making and using the same. Filtration and barrier media comprising sintered polymeric materials of the present invention can form sufficient seals with housings to prevent fluid circumventing the material without being subjected to the precise tolerances often required by filtration apparatus. Filtration and barrier media comprising sintered porous polymeric materials of the present invention can demonstrate flexible properties allowing the media to conform to variations and inconsistencies in surfaces of the housing thereby facilitating sufficient sealing with the housing and reducing product failure and discardment due to fluid bypass. Moreover, the flexible properties of filtration and barrier media of the present invention can permit the porosity of the media to be adjusted according to various applications.

Filtration media, according to embodiments of the present invention, are operable to pass liquids and gases to filter contaminants or other desired species in the liquids or gases. When a liquid or gas flows through a filtration medium of the present invention, contaminants or other desired species, such as target molecules or substances, become associated with the filtration medium and are removed the liquid or gas. In being operable to filter both liquids and gases, filtration media of the present invention, in some embodiments, comprise no or substantially no absorbent or super-absorbent materials.

Barrier media, according to some embodiments, however, permit the passage of gases but inhibit and/or prevent the flow of liquids through the sintered porous polymeric material. By permitting the passage of gases and inhibiting and/or preventing the passage of liquids, barrier media of the present invention can protect downstream equipment and processes from contamination resulting from contact with undesired fluids. Barrier media of the present invention, for example, can serve as in-line barrier media in a pipe or a tube to prevent liquid flow through the pipe or tube. In another embodiment, barrier media can be placed in pipette tips and act as pipette tip filters to prevent pipetted fluid from contaminating the pipettor.

Filtration Media and Barrier Media

In one embodiment, the present invention provides a filtration medium comprising a sintered porous polymeric material, the sintered porous polymeric material comprising at least one plastic and at least one elastomer. In some embodiments, a sintered porous polymeric material of a filtration medium further comprises at least one color change indicator.

In another embodiment, the present invention provides a filtration medium comprising a sintered porous polymeric material comprising a flexible region continuous with a and a rigid region. The flexible region of the continuous sintered porous polymeric material, in some embodiments, comprises a first plastic and at least one elastomer, and the rigid region comprises a second plastic. In some embodiments, the flexible region comprises a first plastic, at least one elastomer, and a first color change indicator, and the rigid region comprises a second plastic and a second color change indicator. In other embodiments, a color change indicator is incorporated into only one of the flexible and rigid regions.

In another embodiment, the present invention provides a barrier medium comprising a sintered porous polymeric material, the sintered porous polymeric material comprising at least one plastic and at least one elastomer. In some embodiments, a liquid barrier medium comprises a sintered porous polymeric material comprising a flexible region continuous with a rigid region as provided herein.

In some embodiments, a liquid barrier medium comprising a sintered porous polymeric material comprising at least one plastic and at least one elastomer further comprises at least one super-absorbent material. Super-absorbent materials suitable for use in barrier media, according to embodiments of the present invention, rapidly swell when contacted with water or other aqueous solutions but do not dissolve in water or aqueous solutions. The swelling of the super-absorbent material, in some embodiments, can seal the barrier medium preventing further flow of fluids through the filtration medium.

In other embodiments, a liquid barrier medium comprising a sintered porous polymeric material comprising at least one plastic and at least one elastomer does not include a super-absorbent material. In a further embodiment, a liquid barrier medium comprising a sintered porous polymeric material comprising at least one plastic and at least one elastomer further comprises a hydrophobic coating such as fluorinated molecular coating as described in U.S. Pat. Nos. 6,638,610 and 6,358,569. In one embodiment, a liquid barrier medium comprising a sintered porous polymeric material comprising at least one plastic and at least one elastomer further comprises at least one color change indicator.

Color change indicators suitable for use in sintered porous polymeric materials of filtration and barrier media, in some embodiments, are consistent with any of the color change indicators described herein.

A color change indicator, according to embodiments of the present invention, is operable to at least partially change the color of the sintered porous polymeric material of filtration and barrier media when contacted with an aqueous and/or organic liquid. In some embodiments, the color change indicator changes the sintered porous polymeric material from a first color to a second color when contacted with an aqueous and/or organic liquid. In other embodiments, the color change indicator changes the sintered porous polymeric material from colorless or white to colored. The color change of the sintered porous polymeric material of a filtration or barrier medium, according to embodiments of the present invention, depends on the identity of the color change indicator selected. The change in color provides a user an indication that the filtration or barrier medium has come into contact with a liquid.

Sintered Polymeric Materials of Filtration Media and Barrier Media

A sintered polymeric material of filtration and barrier media, in some embodiments of the present invention, comprises at least one elastomer in an amount ranging from about 10 weight percent to about 90 weight percent. In other embodiments, a sintered polymeric material comprises at least one elastomer in an amount ranging from about 20 weight percent to about 80 weight percent. In another embodiment, a sintered polymeric material comprises at least one elastomer in an amount ranging from about 30 weight percent to about 70 weight percent. In a further embodiment, a sintered polymeric material comprises at least one elastomer in an amount ranging from about 40 weight percent to about 60 weight percent.

A sintered porous polymeric material comprising at least one plastic and at least one elastomer, in some embodiments, has a porosity ranging from about 10% to about 90%. In other embodiments, a sintered porous polymeric material comprising at least one plastic and at least one elastomer has a porosity ranging from about 20% to about 80% or from about 30% to about 70%. In a further embodiment, a sintered polymeric material comprising at least one plastic and at least one elastomer has a porosity ranging from about 40% to about 60%.

Sintered porous polymeric materials comprising at least one plastic and at least one elastomer, according to some embodiments of the present invention, have an average pore size ranging from about from about 1 μm to about 200 μm. In other embodiments, sintered porous polymeric materials comprising at least one plastic and at least one elastomer have an average pore size ranging from about 2 μm to about 150 μm, from about 5 μm to about 100 μm, or from about 10 μm to about 50 μm. In another embodiment, a sintered porous polymeric material has an average pore size less than about 1 μm. In one embodiment, a sintered porous polymeric material comprising at least one plastic and at least one elastomer has an average pore size ranging from about 0.1 μm to about 1 μm. In a further embodiment, a sintered porous polymeric material of the present invention has an average pore size greater than 200 μm. In one embodiment, a sintered porous polymeric material comprising at least one plastic and at least one elastomer has an average pore size ranging from about 200 μm to about 500 μm or from about 500 μm to about 1 mm.

Sintered porous polymeric materials comprising at least one plastic and at least one elastomer, according to some embodiments, have a density ranging from about 0.1 g/cm$^3$ to about 1 g/cm$^3$. In other embodiments, a sintered porous polymeric material of the present invention has a density ranging from about 0.2 g/cm$^3$ to about 0.8 g/cm$^3$ or from about 0.4 g/cm$^3$ to about 0.6 g/cm$^3$. In a further embodiment, a sintered porous polymeric material comprising at least one plastic and at least one elastomer has a density greater than about 1 g/cm$^3$. In one embodiment, a sintered porous polymeric material comprising at least one plastic and at least one elastomer has a density less than about 0.1 g/cm$^3$.

In some embodiments, a sintered porous polymeric material of a filtration or barrier medium comprising at least one plastic and at least one elastomer has a rigidity according to ASTM D747 of less than about 15 pounds. ASTM D747 is entitled the Standard Test Method for Apparent Bending Modulus of Plastics by Means of a Cantilever Beam and is well suited for determining relative flexibility of materials over a wide range. In other embodiments, a sintered porous polymeric material comprising at least one plastic and at least one elastomer has a rigidity according to ASTM D747 of less than about 10 pounds. In a further embodiment, a sintered polymeric material comprising at least one plastic and at least on elastomer has a rigidity according to ASTM D747 of less than about 5 pounds. In another embodiment, a sintered porous polymeric material comprising at least one plastic and at least on elastomer has a rigidity according to ASTM D747 of less than about 1 pound.

Moreover, in some embodiments, a sintered porous polymeric material comprising at least one plastic and at least one elastomer has a tensile strength ranging from about 10 to about 5,000 psi as measured according to ASTM D638. A sintered porous polymeric material comprising at least one plastic and at least one elastomer, in some embodiments, has a tensile strength ranging from about 50 to 3000 psi or from about 100 to 1,000 psi as measured according to ASTM D638. In some embodiments, a sintered porous polymeric material comprising at least one plastic and at least one elastomer has an elongation from ranging from 10% to 500%.

In some embodiments, a sintered polymeric material of a barrier medium comprising at least one elastomer and at least one plastic further comprises at least one super-absorbent material. In some embodiments, super-absorbent materials comprise hydrolyzed starch acrylonitrile graft copolymer, neutralized starch-acrylic acid graft copolymer, saponified acrylic acid ester-vinyl acetate copolymer, hydrolyzed acrylonitrile copolymer, acrylamide copolymer, modified crosslinked polyvinyl alcohol, neutralized self-crosslinking polyacrylic acid, crosslinked polyacrylate salts, neutralized crosslinked isobutylene-maleic anhydride copolymers, and salts and mixtures thereof. Super-absorbent materials, in some embodiments, comprise those disclosed by U.S. Pat. Nos. 5,998,032, 5,939,086, 5,836,929, 5,824,328, 5,797,347, 5,750,585, 5,175,046, 4,820,577, 4,724,114, and 4,443,515. Examples of commercially available super-absorbent materials comprise AP80HS, available from Stockhousen of Tuscaloosa, Ala., and HYSORB® P7200, available from BASF of Budd Lake, N.J.

In some embodiments, a super-absorbent material comprises particles, fibers, or mixtures thereof. Particulate super-absorbent materials, in some embodiments, have average sizes ranging from about 1 μm to about 1 mm. In another embodiment, super-absorbent particles have an average size ranging from about 10 μm to about 900 μm, from about 50 μm to about 500 μm, or from about 100 μm to about 300 μm. In a further embodiment, super-absorbent particles have an average size less than about 1 μm or greater than about 1 mm.

Moreover, super-absorbent fibers, in some embodiments, have an average diameter ranging from about 1 μm to about 1 mm or from about 10 μm to about 750 μm. In another embodiment, super-absorbent fibers have an average diameter ranging from about 50 μm to about 500 μm, from about 100 μm to about 400 μm or from about 200 μm to about 300 μm. Super-absorbent fibers, in some embodiments, have a length ranging from about 100 µm to about 2.5 cm or from about 250 µm to about 1 cm. In another embodiment, super-absorbent fibers have a length ranging from about 500 µm to about 1.5 mm or from about 750 µm to about 1 mm.

In some embodiments, a sintered porous polymeric material of a barrier medium comprises at least one super-absorbent material in an amount ranging from about 10 weight percent to about 90 weight percent. In other embodiments, a sintered porous polymeric material of a barrier medium comprises at least one super-absorbent material in an amount ranging from about 20 weight percent to about 80 weight percent. In another embodiment, a sintered porous polymeric material of a barrier medium comprises at least one super-absorbent material in an amount ranging from about 30 weight percent to about 70 weight percent. In a further embodiment, a sintered porous polymeric material of a barrier medium comprises at least one super-absorbent material in an amount ranging from about 40 weight percent to about 60 weight percent.

Super-absorbent materials of barrier media, in some embodiments, are incorporated into the sintered porous matrix of the polymeric material. In other embodiments, super-absorbent materials are located in the pores of the sintered porous polymeric material of a barrier medium. In one embodiment, a super-absorbent material resides in the majority of the pores of the sintered porous polymeric material of a barrier medium. In another embodiment, a super-absorbent material resides in the minority of pores of the sintered porous polymeric material of a barrier medium. In a further embodiment, super-absorbent materials are located in both the sintered porous matrix and the pores of the sintered porous polymeric material of a barrier medium.

In another embodiment, a sintered porous polymeric material of filtration and barrier media comprising at least one plastic and at least one elastomer further comprises at least one color change indicator. Color change indicators suitable for use in sintered polymeric materials of filtration and barrier media of the present invention, in some embodiments, are consistent with any of the color change indicators described herein.

In some embodiments, a sintered porous polymeric material of filtration and barrier media comprising at least one plastic and at least one elastomer comprises at least one color change indicator in an amount ranging from about 0.001 weight percent to about 2 weight percent. In other embodiments, a sintered porous polymeric material comprises at least one color change indicator in an amount ranging from about 0.01 weight percent to about 1 weight percent. In a further embodiment, a sintered porous polymeric material comprises at least one color change indicator in an amount ranging from about 0.05 weight percent to about 0.5 weight percent.

The sintered porous polymeric material of a barrier medium, in some embodiments of the present invention, further comprises a hydrophobic coating. A hydrophobic coating, in some embodiments, comprises a fluorinated hydrophobic coating. A fluorinated hydrophobic coating, in one embodiment, comprises one or more fluorinated polymers. Fluorinated polymers, according to some embodiments, are produced from the polymerization of perfluorinated monomers, partially fluorinated monomers, or combinations thereof. Fluorinated polymeric materials suitable for use in coating a barrier medium of the present invention comprise fluorinated acrylates such as fluorinated methacrylates. Fluorinated methacrylates, in some embodiments, comprise perfluorohexyl methacrylate, perfluoroheptyl methacrylate, perfluorooctyl methacrylate, perfluorononylmethacrylate, perfluorodecyl methacrlyate, perfluoroundecyl methacrylate, perfluorododecyl methacrylate, or mixtures thereof. In another embodiment, fluorinated polymeric materials comprise fluorinated acrylic esters.

Filtration or barrier media comprising at least one elastomer and at least one plastic can have any desired shape or form such as disks, tubes, blocks, cones, cylinders, sheets, or films.

Moreover, the flexible properties of filtration or barrier media comprising at least one elastomer and at least one plastic can facilitate placement of the filtration or barrier media in a housing. The flexible properties allow filtration or barrier media of the present invention, in some embodiments, to conform to filtration housings and accommodate inconsistencies or defects in the housings thereby providing enhanced sealing with the housing. As a result, the filtration or barrier media can be correctly and securely disposed in housings without being limited to the tight tolerances associated with previous filtration media. The secure placement of filtration or barrier media of the present invention in housings can reduce the occurrences of fluid circumventing the filtration media and reduce product failure and losses due to housing inconsistencies and variations.

In another aspect, a sintered porous polymeric material of filtration and barrier media of the present invention, in some embodiments, comprises a flexible region continuous with a rigid region, wherein the flexible region comprises a first plastic and at least one elastomer and the rigid region comprises a second plastic. In some embodiments, the first and second plastics comprise the same plastics. In other embodiments, the first and second plastics comprise different plastics.

A continuous sintered porous polymeric material comprising a flexible region and a rigid region, in some embodiments, further comprises plastics in addition to the first and second plastics. In one embodiment, for example, the flexible region of a continuous sintered polymeric material comprises one or more plastics in addition to the first plastic. Moreover, the rigid region, in some embodiments, comprises one or more plastics in addition to the second plastic.

In some embodiments, the flexible region of a continuous sintered porous polymeric material of a filtration or barrier medium comprises at least one elastomer in an amount ranging from about 10 weight percent to about 90 weight percent. In other embodiments, the flexible region comprises at least one elastomer in an amount ranging from about 20 weight percent to about 80 weight percent. In another embodiment, the flexible region comprises at least one elastomer in an amount ranging from about 30 weight percent to about 70 weight percent. In a further embodiment, the flexible region comprises at least one elastomer in an amount ranging from about 40 weight percent to about 60 weight percent.

In some embodiments, the flexible region comprising a first plastic and at least one elastomer has a porosity ranging from about 10% to about 90%. In another embodiment, the flexible region has a porosity ranging from about 20% to about 80% or from about 30% to about 70%. In a further embodiment, the flexible region has a porosity ranging from about 40% to about 60%.

In some embodiments, the flexible region of a continuous sintered porous polymeric material of a filtration or barrier medium has an average pore size ranging from about 1 µm to about 200 µm. In other embodiments, the flexible region has an average pore size ranging from about 2 µm to about 150 µm, from about 5 µm to about 100 µm or from about 10 µm to about 50 µm. In another embodiment, the flexible region has an average pore size less than about 1 µm. In one embodiment, the flexible region has an average pore size ranging from about 0.1 μm to about 1 μm. In a further embodiment, the flexible region has an average pore size greater than 200 μm. In one embodiment, the flexible region has an average pore size ranging from about 200 μm to about 500 μm or from about 500 μm to about 1 mm.

The flexible region of a continuous sintered porous polymeric material, according to some embodiments, has a density ranging from about 0.1 g/cm$^3$ to about 1 g/cm$^3$. In other embodiments, the flexible region has a density ranging from about 0.2 g/cm$^3$ to about 0.8 g/cm$^3$ or from about 0.4 g/cm$^3$ to about 0.6 g/cm$^3$. In a further embodiment, the flexible region has a density greater than about 1 g/cm$^3$. In one embodiment, the flexible region has a density less than about 0.1 g/cm$^3$.

In some embodiments, the flexible region of a continuous sintered porous polymeric material has rigidity according to ASTM D747 of less than about 15 pounds. In other embodiments, the flexible region of a sintered polymeric material has a rigidity according to ASTM D747 of less than about 10 pounds. In another embodiment, the flexible region of a continuous sintered polymeric material has a rigidity according to ASTM D747 of less than about 5 pounds. In a further embodiment, a sintered polymeric material comprising at least one plastic and at least on elastomer has a rigidity according to ASTM D747 of less than about 1 pound.

The rigid region of a continuous sintered porous polymeric material of a filtration or barrier medium, according embodiments of the present invention, comprises a second plastic. In some embodiments, the rigid region does not comprise elastomeric materials or substantially no elastomeric materials in addition to the second plastic. In other embodiments, the rigid region comprises less than about 20 weight percent elastomer. In another embodiment, the rigid region comprises less than about 10 weight percent elastomer. In a further embodiment, the rigid region comprises less than about 5 weight percent elastomer.

In some embodiments, the rigid region has a porosity ranging from about 10% to about 90%. In other embodiments, the rigid region has a porosity ranging from about 20% to about 80% or from about 30% to about 70%. In another embodiment, the rigid region has a porosity ranging from about 40% to about 60%.

In some embodiments, the rigid region of a continuous sintered porous polymeric material of a filtration or barrier medium has an average pore size ranging from about 1 μm to about 200 μm. In other embodiments, the rigid region has an average pore size ranging from about 2 μm to about 150 μm, from about 5 μm to about 100 μm or from about 10 μm to about 50 μm. In another embodiment, the rigid region has an average pore size less than about 1 μm. In one embodiment, the rigid region has an average pore size ranging from about 0.1 μm to about 1 μm. In a further embodiment, the rigid region has an average pore size greater than 200 μm. In one embodiment, the rigid region has an average pore size ranging from about 200 μm to about 500 μm or from about 500 μm to about 1 mm.

The rigid region of a continuous sintered porous polymeric material, according to some embodiments, has a density ranging from about 0.1 g/cm$^3$ to about 1 g/cm$^3$. In other embodiments, the rigid region has a density ranging from about 0.2 g/cm$^3$ to about 0.8 g/cm$^3$ or from about 0.4 g/cm$^3$ to about 0.6 g/cm$^3$. In a further embodiment, the rigid region has a density greater than about 1 g/cm$^3$. In one embodiment, the rigid region has a density less than about 0.1 g/cm$^3$.

In some embodiments, the rigid region of a continuous sintered porous polymeric material has rigidity according to ASTM D747 of greater than about 15 pounds. In other embodiments, the rigid region of a sintered polymeric material has a rigidity according to ASTM D747 of greater than about 10 pounds. In another embodiment, the rigid region of a continuous sintered polymeric material has a rigidity according to ASTM D747 of greater than about 5 pounds.

In some embodiments, the flexible region of a sintered porous polymeric material of a barrier medium further comprises a first super-absorbent material. Super-absorbent materials suitable for use in the flexible region of a continuous sintered porous polymeric material of a barrier medium, in some embodiments, are consistent with those provided herein.

In some embodiments, the flexible region of a continuous sintered porous polymeric material of a barrier medium comprises a first super-absorbent material in an amount ranging from about 10 weight percent to about 90 weight percent. In other embodiments, the flexible region of a continuous sintered porous polymeric material of a barrier medium comprises a first super-absorbent material in an amount ranging from about 20 weight percent to about 80 weight percent. In another embodiment, the flexible region of a continuous sintered porous polymeric material of a barrier medium comprises a first super-absorbent material in an amount ranging from about 30 weight percent to about 70 weight percent. In a further embodiment, the flexible region of a continuous sintered porous polymeric material of a barrier medium comprises a first super-absorbent material in an amount ranging from about 40 weight percent to about 60 weight percent.

In some embodiments, the rigid region of a sintered porous polymeric material of a barrier medium further comprises a second super-absorbent material. Super-absorbent materials suitable for use in the rigid region of a continuous sintered porous polymeric material of a barrier medium, in some embodiments, are consistent with those provided herein. The second super-absorbent material, in some embodiments, is the same as the first super-absorbent material of the flexible region. In other embodiments, the second super-absorbent material of the rigid region is different than the first super-absorbent material of the flexible region.

In some embodiments, the rigid region of a continuous sintered porous polymeric material of a barrier medium comprises a second super-absorbent material in an amount ranging from about 10 weight percent to about 90 weight percent. In other embodiments, the rigid region of a continuous sintered porous polymeric material of a barrier medium comprises a second super-absorbent material in an amount ranging from about 20 weight percent to about 80 weight percent. In another embodiment, the rigid region of a continuous sintered porous polymeric material of a barrier medium comprises a second super-absorbent material in an amount ranging from about 30 weight percent to about 70 weight percent. In a further embodiment, the rigid region of a continuous sintered porous polymeric material of a barrier medium comprises a second super-absorbent material in an amount ranging from about 40 weight percent to about 60 weight percent.

In some embodiments, the flexible region of a continuous sintered porous polymeric material further comprises at least one color change indicator. Color change indicators suitable for use in the flexible region of a continuous sintered porous polymeric material, in some embodiments, are consistent with those provided herein.

In some embodiments, the flexible region of a continuous sintered porous polymeric material comprises at least one color change indicator in an amount ranging from about 0.001 weight percent to about 2 weight percent. In other embodiments, the flexible region comprises at least one color change indicator in an amount ranging from about 0.01 weight percent to about 1 weight percent. In a further embodiment, the flexible region comprises at least one color change indicator in an amount ranging from about 0.05 weight percent to about 0.5 weight percent.

In some embodiments, the rigid region of a continuous sintered porous polymeric material further comprises at least one color change indicator. Color change indicators suitable for use in the rigid region of a continuous sintered porous polymeric material, in some embodiments, are consistent with those provided herein.

In some embodiments, the rigid region of a continuous sintered porous polymeric material comprises at least one color change indicator in an amount ranging from about 0.001 weight percent to about 2 weight percent. In other embodiments, the rigid region comprises at least one color change indicator in an amount ranging from about 0.01 weight percent to about 1 weight percent. In a further embodiment, the rigid region comprises at least one color change indicator in an amount ranging from about 0.05 weight percent to about 0.5 weight percent.

Figure 6:
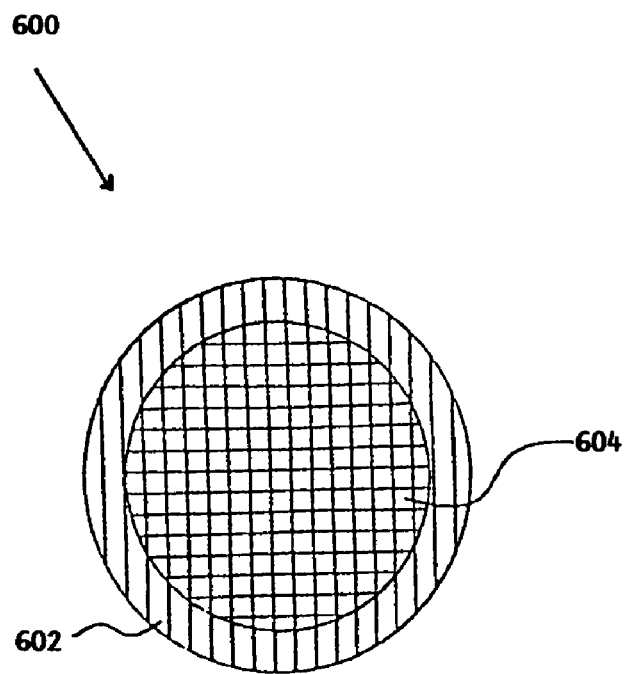
FIG. 6 illustrates a top cross-sectional view of a filtration medium comprising a continuous sintered porous polymeric material comprising a flexible region and a rigid region according to an embodiment of the present invention.

FIG. 6 illustrates a filtration medium comprising a continuous sintered porous polymeric material comprising a flexible region and a rigid region according to one embodiment of the present invention. The filtration medium (600) shown in FIG. 6 has the shape of a disk wherein the flexible region (602) encircles the rigid region (604). The flexible region (602) along the circumference of the disk facilitates placement of the filtration medium (600) in a housing. The flexible properties of the flexible region (602), as provided herein, allow the flexible region to conform to a filtration housing and accommodate inconsistencies or defects in the housing thereby providing enhanced sealing with the housing. As a result, the filtration medium (600) can be correctly and securely disposed in a housing without being limited to the tight tolerances associated with previous filtration media. The secure placement of the filtration medium (600) can lead to a reduction in the occurrence of fluid by-passing the filtration medium (600).

Figure 7:
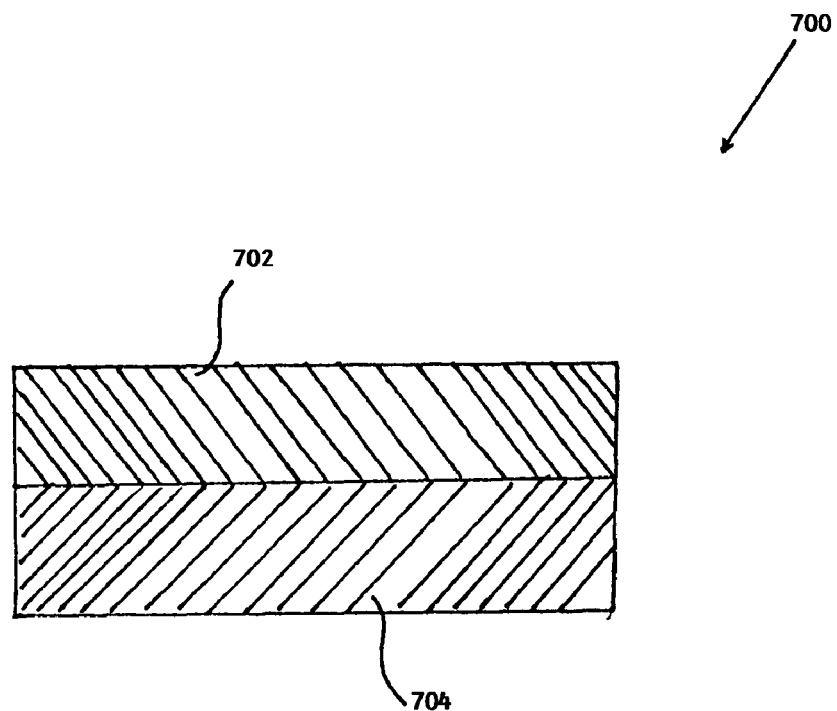
FIG. 7 illustrates a side cross-sectional view of filtration medium comprising a continuous sintered porous polymeric material comprising a flexible region and a rigid region according to one embodiment of the present invention.

FIG. 7 illustrates a filtration medium comprising a continuous sintered porous polymeric material comprising a flexible region and a rigid region according to one embodiment of the present invention. The filtration medium (700) shown in FIG. 7 comprises a flexible region (702) comprising at least one elastomer and at least one plastic and a rigid region (704) comprising a second plastic.

Filters and Apparatus Comprising Filtration Media and/or Barrier Media

In another aspect, the present invention provides a filter comprising a housing and at least one filtration medium disposed in the housing, the filtration medium comprising a sintered polymeric material comprising at least one plastic and at least one elastomer as provided herein. In some embodiments, the filtration medium further comprises at least one color change indicator as provided herein.

In other embodiments, a filtration medium of a filter comprises a continuous sintered porous polymeric material comprising a flexible region and a rigid region, the flexible region comprising a first plastic and at least one elastomer as provided herein. The rigid region, in some embodiments, comprises a second plastic as provided herein. In some embodiments, the flexible and/or rigid region further comprises at least one color change indicator.

In another embodiment, the present invention provides an apparatus comprising a housing and at least one barrier medium disposed in the housing, the barrier medium comprising a sintered polymeric material comprising at least one plastic and at least one elastomer as described herein. In some embodiments, the barrier medium further comprises at least one super-absorbent material. In other embodiments, the barrier medium further comprises a hydrophobic coating such as a fluorinated coating. In one embodiment, a fluorinated coated comprises a fluorinated polymeric coating.

A housing, in some embodiments of the present invention, comprises a pipette tip, a chromatographic column such as those used in liquid chromatography, a vacuum filtration housing, a funnel, a tube, a syringe, a catheter, a duct, or combinations thereof. In some embodiments, housings comprising pipette tips can come in a variety of shapes and sizes to fit any type or brand of pipettor. In one embodiment, a housing comprises a tubular housing as described in U.S. Pat. No. 5,259,956. In some embodiments, a housing comprises a tube wherein the filtration medium serves as an in-line filter operable to filter fluids. In one embodiment, a barrier medium of the present invention is placed upstream and/or downstream of the filtration medium to prevent the passage of undesired fluids. In another embodiment, a housing comprises fluid flow control devices, such as a suction canister as detailed in PCT Application Publication Number WO 87/00439. In another embodiment, a housing comprises luer lock apparatus often used in medical and laboratory applications, such as those described in U.S. Pat. No. 5,620,427.

Figure 8:
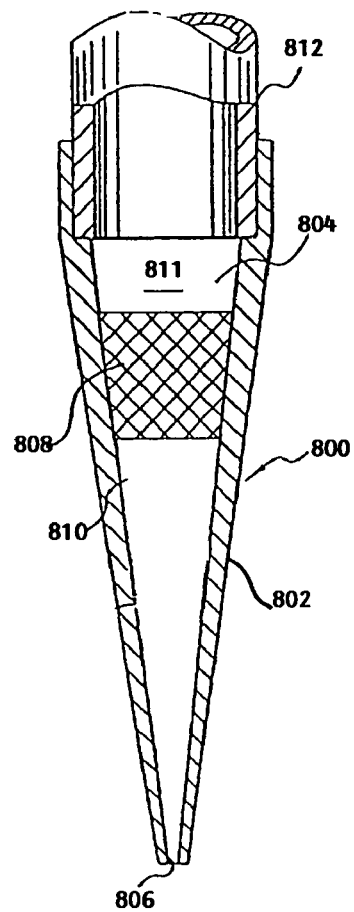
FIG. 8 illustrates a barrier medium disposed in a pipette tip according to an embodiment of the present invention.

FIG. 8 illustrates a barrier medium disposed in a pipette tip housing according to an embodiment of the present invention. As understood by one of skill in the art, when disposed in a pipette tip, a barrier medium can serve as a pipette tip filter. The pipette tip (800) comprises a tapering, hollow tubular member (802) constructed of an inert material such as glass or plastic and is open at a first end (804) and a second end (806), the first (804) and second (806) ends are in facing opposition. A barrier medium (808) comprising a sintered porous polymeric material comprising at least one elastomer, at least one plastic, and optionally at least one super-absorbent material is disposed in the tubular member (802) to define a liquid sample chamber (810) between the barrier medium (808) and second end (806). The barrier medium (808) is additionally spaced from the first end (804) of the tubular member (802) to define a chamber (811) between the barrier medium (808) and first end (804)

The first end (804) of the tubular member (802) is releasably secured to a suitable suction device (812) as known to one of skill in the art. Any suitable suction device for drawing a predetermined volume of liquid in the chamber (810) can be used, such as a volumetric pipetter, suction pump, elastic bulb, bellows, etc. The barrier medium (808), in some embodiments, is force or pressure fitted securely into tubular member (802), under a sufficient pressure so that it is securely held and frictionally sealed against the inner wall of tubular member (802) although not attached to the inner wall by any adhesive or other additional material. The flexible properties of the barrier medium (808) allows for a secure seal with the wall of the tubular member (802) and can accommodate inconsistencies or defects along interior surfaces of the tubular member (802) in contact with the filtration medium (808).

In some embodiments, the flexible region of a filtration or barrier medium is compressed or otherwise deformed when the medium is disposed in a housing. Compression or deformation of the flexible region can allow a filtration or barrier medium to fit into a variety of housings having differing dimensions thereby precluding the need to design and manufacture a specific filtration or barrier medium for a specific housing. Moreover, compression of the flexible region can preclude or inhibit deformation of the rigid region of the filtration or barrier medium. Preventing deformation of the rigid region, in some embodiments, allows the rigid region to demonstrate a uniform pore structure and porosity. The filtration medium of FIG. 6, for example, comprises a flexible region (602) encircling a rigid region (604). When disposed in a housing, the flexible region (602), in some embodiments, is placed in compression while the rigid region (604) remains in an unperturbed state. In one embodiment, a flexible region of a filtration or barrier medium serves as a housing sealing component and a rigid region serves as a filtration or barrier component.

Methods for Producing Filtration and Barrier Media

In another aspect, the present invention provides methods of producing a filtration or barrier medium comprising a sintered porous polymeric material. In one embodiment, a method for producing a filtration or barrier medium comprising a sintered porous polymeric material comprises providing particles of at least one elastomer, providing particles of at least one plastic, and sintering the plastic and elastomer particles. For barrier media, in some embodiments, at least one super-absorbent material is added to the particles of the at least one elastomer and at least one plastic and sintered with the particles of the at least one elastomer and at least one plastic. In some embodiments, the at least one super-absorbent material is added as particles. In other embodiments, the super-absorbent material is added as fibers.

In some embodiments, particles of at least one plastic and particles of at least one elastomer are mixed in a desired ratio (weight percent) to produce a substantially uniform mixture. The uniform mixture of plastic and elastomer particles are disposed in a mold and sintered. The shape of the mold can be any desired shape, such as disks, tubes, cones, and/or tapered shapes such as frustroconical shapes, allowing for the facile and single-step production of filtration or barrier media.

Plastic and elastomer particles, in some embodiments, have average sizes ranging from about 1 µm to about 1 mm. In another embodiment, plastic and elastomer particles have average sizes ranging from about 10 µm to about 900 µm, from about 50 µm to about 500 µm, or from about 100 µm to about 400 µm. In a further embodiment, plastic and elastomer particles have average sizes ranging from about 200 µm to about 300 µm. In some embodiments, plastic and elastomer particles have average sizes less than about 1 µm or greater than about 1 mm.

Sizes of plastic and elastomer particles, in some embodiments, are selected independently. In one embodiment, for example, the plastic particles have an average size greater than the elastomer particles. In another embodiment, plastic particles have an average size smaller than the elastomer particles. In a further embodiment, plastic and elastomer particles have about the same average size.

Plastic and elastomer particles, in some embodiments, are sintered at a temperature ranging from about 200° F. to about 700° F. In some embodiments, plastic and elastomer particles are sintered at a temperature ranging from about 300° F. to about 500° F. The sintering temperature, according to embodiments of the present invention, is dependent upon and selected according to the identity of the plastic and elastomer particles.

Plastic and elastomer particles, in some embodiments, are sintered for a time period ranging from about 30 seconds to about 30 minutes or a time sufficient to produce the sintered porous polymeric material. In other embodiments, plastic and elastomer particles are sintered for a time period ranging from about 1 minute to about 15 minutes or from about 5 minutes to about 10 minutes. In some embodiments, the sintering process comprises heating, soaking, and/or cooking cycles. Moreover, in some embodiments, sintering of plastic and elastomer particles is conducted under ambient pressure (1 atm). In other embodiments sintering of plastic and elastomer particles is conducted under pressures greater than ambient pressure.

In some embodiments of producing filtration or barrier media, at least one color change indicator is added to the particles of the at least one elastomer and at least one plastic and sintered with the particles of the at least one elastomer and the at least one plastic according to temperatures and times set forth herein. Particles of a color change indicator, according to some embodiments, have average sizes ranging from about 1 µm to about 500 µm or from about 10 µm to about 400 µm. In another embodiment, particles of a color change indicator have average sizes ranging from about 50 µm to about 300 µm. In a further embodiment, particles of a color change indicator have average sizes ranging from about 100 µm to about 200 µm. In some embodiments, particles of a color change indicator have average sizes less than about 1 µm or greater than about 500 µm.

In another embodiment, a method of producing a filtration or barrier medium comprising a sintered porous polymeric material comprises disposing particles of a first plastic mixed with particles of at least one elastomer in a first part of a mold, disposing particles of a second plastic in a second part of the mold adjacent to the first part of the mold, and sintering the first plastic particles, second plastic particles and elastomer particles. For barrier media, in some embodiments, at least one super-absorbent material is added to the particles of the at least one elastomer, first plastic, and second plastic, and sintered with the particles of the at least one elastomer, first plastic, and second plastic. In some embodiments, the at least one super-absorbent material is added as particles. In other embodiments, the super-absorbent material is added as fibers.

In one embodiment, for example, particles of a first plastic are mixed with particles of at least one elastomer in a desired ratio (weight percent) to produce a substantially uniform mixture. The mixture is disposed in a first part of a mold. Particles of a second plastic are disposed in the second part of the mold adjacent to the mixture of particles of the first plastic and at least one elastomer. The particles of the first plastic, second plastic, and elastomer particles are subsequently sintered to produce a polymeric material of the present invention. In some embodiments, the first part of a mold comprises the bottom half of the mold. Moreover, in some embodiments, the second part of a mold comprises the top half of the mold.

In other embodiments, particles of a second plastic are disposed in the first part of a mold. The mixture of elastomer and first plastic particles are disposed in the second part of the mold adjacent to the second plastic particles. The particles of the first plastic, second plastic, and elastomer particles are subsequently sintered to produce a polymeric material of the present invention.

First plastic, second plastic, and elastomer particles, in some embodiments, have average sizes ranging from about 1 µm to about 1 mm. In another embodiment, first plastic, second plastic, and elastomer particles have average sizes ranging from about 10 µm to about 900 µm, from about 50 µm to about 500 µm, or from about 100 µm to about 400 µm. In a further embodiment, first plastic, second plastic, and elastomer particles have average sizes ranging from about 200 µm to about 300 µm. In some embodiments, first plastic, second plastic, and elastomer particles have average sizes less than about 1 µm or greater than about 1 mm. Sizes of first plastic, second plastic, and elastomer particles, in some embodiments, are selected independently.

First plastic, second plastic, and elastomer particles, in some embodiments, are sintered at a temperature ranging from about 200° F. to about 700° F. In some embodiments, first plastic, second plastic, and elastomer particles are sintered at a temperature ranging from about 300° F. to about 500° F. The sintering temperature, according to embodiments of the present invention, is dependent upon and selected according to the identity of the first plastic, second plastic and elastomer particles.

First plastic, second plastic, and elastomer particles, in some embodiments, are sintered for a time period ranging from about 30 seconds to about 30 minutes. In other embodiments, first plastic, second plastic, and elastomer particles are sintered for a time period ranging from about 1 minute to about 15 minutes or from about 5 minutes to about 10 minutes. In some embodiments, the sintering process comprises heating, soaking, and/or cooking cycles. Moreover, in some embodiments, sintering of first plastic, second plastic, and elastomer particles is performed under ambient pressure (1 atm). In other embodiments sintering of first plastic, second plastic, and elastomer particles is conducted under pressures greater than ambient pressure.

In some embodiments of producing filtration and barrier media, at least one color change indicator is added to the particles of the first plastic, second plastic and at least one elastomer and sintered with the particles of the first plastic, second plastic, and at least one elastomer according to temperatures and times set forth herein. Particles of a color change indicator, according to some embodiments, have average sizes ranging from about 1 µm to about 500 µm or from about 10 µm to about 400 µm. In another embodiment, particles of a color change indicator have average sizes ranging from about 50 µm to about 300 µm. In a further embodiment, particles of a color change indicator have average sizes ranging from about 100 µm to about 200 µm. In some embodiments, particles of a color change indicator have average sizes less than about 1 µm or greater than about 500 µm.

A polymeric material produced by sintering particles of a first plastic, a second plastic, and at least one elastomer, in embodiments of the present invention, can comprise a flexible region and a rigid region, the flexible region comprising the first plastic and the at least one elastomer, and the rigid region comprising the second plastic. The shape of the mold can be any desired shape, such as disks, tubes, or cones, allowing for the facile and single-step production of filtration or barrier media. The shape of the mold can be any desired shape, such as disks, tubes, cones, and/or tapered shapes such as frustroconical shapes, allowing for the facile and single-step production of filtration or barrier media.

In one embodiment of method of making a barrier medium, the method further comprises coating the sintered porous polymeric material of the barrier medium with a hydrophobic coating. A hydrophobic coating, in some embodiments, comprises a fluorinated hydrophobic coating. A fluorinated hydrophobic coating, in one embodiment, comprises one or more fluorinated polymers. Fluorinated polymers, according to some embodiments, are produced from the polymerization of perfluorinated monomers, partially fluorinated monomers, or combinations thereof. Fluorinated polymeric materials suitable for use in coating a barrier medium of the present invention comprise fluorinated acrylates such as fluorinated methacrylates. Fluorinated methacrylates, in some embodiments, comprise perfluorohexyl methacrylate, perfluoroheptyl methacrylate, perfluorooctyl methacrylate, perfluorononylmethacrylate, perfluorodecyl methacrlyate, perfluoroundecyl methacrylate, perfluorododecyl methacrylate, or mixtures thereof. In another embodiment, fluorinated polymeric materials comprise fluorinated acrylic esters.

In some embodiments, a fluorinated coating is applied to a barrier medium of the present invention by solubilizing the fluorinated molecules, such as a fluorinated polymer, in a solvent and applying the resulting solution to the surfaces of the barrier medium.

Methods for Producing a Filter

In another aspect, the present invention provides methods of producing a filter. In one embodiment, a method for producing a filter comprises providing a filtration medium comprising a sintered porous polymeric material, providing a housing, and disposing the filtration medium in the housing, wherein the sintered porous polymeric material comprises at least one elastomer and at least one plastic. In some embodiments, the sintered porous polymeric material further comprises at least one color change indicator. In some embodiments, a seal is formed between a surface of the housing and the filtration medium, the seal being operable to inhibit or prevent fluid bypass.

In another embodiment, a method for producing a filter comprises providing a filtration medium comprising a continuous sintered porous polymeric material comprising a flexible region and a rigid region, providing a housing, and disposing the filtration medium in the housing. In some embodiments, the flexible region comprises a first plastic and at least one elastomer, and the rigid region comprises a second plastic. In some embodiments, the flexible region and/or rigid region can further comprise at least one color change indicator. In some embodiments, a method of producing a filter further comprises forming a seal between the flexible region of the filtration medium and a surface of the housing.

Methods for Filtering a Fluid

In another aspect, the present invention provides methods of filtering a fluid. In one embodiment, a method of filtering a fluid comprises providing at least one filtration medium comprising a sintered porous polymeric material and passing a fluid through the at least one filtration medium, wherein the sintered porous polymeric material comprises at least one plastic and at least one elastomer. In some embodiments, the sintered porous polymeric material further comprises at least one color change indicator.

In another embodiment, a method of filtering a fluid comprises providing at least one filtration medium comprising a continuous sintered porous polymeric material comprising a flexible region and a rigid region and passing a fluid through the at least one filtration medium, wherein the flexible region comprises a first plastic and at least one elastomer, and the rigid region comprises a second plastic. In some embodiments, the flexible region and/or rigid region can further comprise at least one color change indicator.

In further embodiment, a method for filtering a fluid comprises providing at least one filtration medium comprising a sintered porous polymeric material, adjusting the porosity of the at least one filtration medium, and passing a fluid through the at least one filtration medium, wherein the sintered porous polymeric material comprises at least one elastomer and at least one plastic. In some embodiments, adjusting the porosity of the filtration medium comprises placing the filtration medium in tension or compression.

The flexible properties a filtration medium of the present invention comprising a sintered porous polymeric material comprising at least one plastic and at least one elastomer allows the porosity of the filtration medium to be varied by placing the filtration medium in tension or compression. Pores of a filtration medium, in some embodiments, are increased in size by placing the filtration medium in tension. The increase in pore size concomitantly increases the porosity of the filtration medium. Conversely, pores of a filtration medium, in some embodiments, are decreased in size by placing the filtration medium in compression. The decrease in pore size results in a decrease in the porosity of the filtration medium. As a result, the pore size and porosity of a filtration medium of the present invention can be tailored for specific filtration and barrier applications.

In another embodiment, a method of filtering a gas comprises providing at least one liquid barrier medium comprising a sintered porous polymeric material, adjusting the porosity of the at least one liquid barrier medium, and passing a gas through the liquid barrier medium while inhibiting and/or preventing liquid from passing through the liquid barrier medium, wherein the sintered porous polymeric material comprises at least one elastomer and at least one plastic. In some embodiments, adjusting the porosity of the liquid barrier medium comprises placing the liquid barrier medium in tension or compression.

In a further aspect, the present invention provides methods for cleaning filtration media or barrier media. In one embodiment, a method for cleaning a filtration or barrier medium comprises adjusting the pore sizes of the filtration or barrier medium to release compositions disposed in the pores wherein the filtration medium or barrier medium comprises at least one plastic and at least one elastomer. In some embodiments, adjusting the pores sizes comprises placing the filtration or barrier medium in tension or compression.

As provided herein, placing a filtration or barrier medium of the present invention in tension or compression, in some embodiments, results in changes to the pore size and porosity of the medium. Changes in pore size and porosity, according to some embodiments, are used to clean filtration or barrier media of the present invention. Placing a filtration or barrier medium comprising a sintered porous polymeric material comprising at least one elastomer and at least one plastic in tension, for example, results in an expansion of pore sizes. The expansion of pore size, in some embodiments, releases compositions disposed in the pores thereby cleaning the filtration or barrier medium.

In another embodiment, a filtration or barrier medium of the present invention is placed in compression to reduce pore sizes of the filtration medium. The reduction in pore sizes, in some embodiments, forces out compositions disposed in the pores thereby cleaning the filtration or barrier medium.

In some embodiments, a filtration or barrier medium of the present invention is cycled through tension and compression forces during cleaning. A filtration or barrier medium, for example, can be placed in tension followed by compression or vice versa. The flexible properties of filtration or barrier media of the present invention reduces the potential failure of the filtration medium due to the application of tensile and compressive forces.

Embodiments of the present invention a further illustrated in the following non-limiting examples.

EXAMPLE 1

Sintered Porous Elastomeric Material

KRATON® elastomers (styrene-ethylene-butadiene styrene) from Kraton Polymers US, LLC were cryogenically ground to powder, the powder having an average particle size around 200 μm. The resulting elastomer particles were filled into the cavity of an aluminum mold and heated to 400° F. for five minutes and then cooled to room temperature in five minutes. The resulting sintered porous elastomeric material was removed from the mold. The sintered porous elastomeric material had an open pore structure with average pore size of about 55 μm and a porosity of about 50%.

EXAMPLE 2

Self-sealing Sintered Porous Elastomeric Material

KRATON® elastomers (styrene-ethylene-butadiene styrene) from Kraton Polymers US, LLC were cryogenically ground to powder, the powder having an average particle size of about 200 μm. Carboxymethylcellulose (CMC) (Sigma-Aldrich) having an average particle size of about 200 μm was mixed with the resulting elastomeric particles to produce a mixture having about 15% by weight CMC. The mixture was filled into the cavity of an aluminum mold and heated to 400° F. for five minutes and then cooled to room temperature in five minutes. The resulting sintered porous elastomeric material was removed from the mold. The sintered porous elastomeric material had CMC dispersed throughout the sintered porous matrix and demonstrated an open pore structure with average pore size around 55 μm and 50% porosity.

EXAMPLE 3

Sintered Porous Polymeric Material Comprising a Plastic and an Elastomer

KRATON® elastomers (styrene-ethylene-butadiene styrene) from Kraton Polymers US, LLC were cryogenically ground to powder, the powder having an average particle size of about 150 μm. 30% by weight of the elastomer powder was mixed with 70% by weight UHMWPE powder (Ticona) having an average particle size of about 150 μm. The resulting mixture was filled into the cavity of an aluminum mold and heated to 360° F. for five minutes and then cooled to room temperature in five minutes. The resulting sintered porous polymeric material was removed from the mold. The sintered porous polymeric material comprising the elastomer and UHMWPE displayed an open pore structure with average pore size around 45 μm and 45% porosity.

EXAMPLE 4

Sintered Porous Polymeric Material Comprising a Plastic and an Elastomer

KRATON® elastomers (styrene-ethylene-butadiene styrene) from Kraton Polymers US, LLC were cryogenically ground to powder, the powder having an average particle size of about 200 μm. 30% by weight of the elastomer powder was mixed with 70% by weight UHMWPE powder (Ticona) having an average size of about 150 μm. The resulting mixture was filled into the cavity of an aluminum mold. The volume of the mold was subsequently compressed to 80% of the original volume. The compressed elastomer/UHMWPE mixture was heated to 360° F. for five minutes and then cooled to room temperature in five minutes. The resulting sintered porous polymeric material was removed from the mold. The sintered porous polymeric material comprising the elastomer and UHMWPE displayed an open pore structure with average pore size around 30 μm and 35% porosity.

EXAMPLE 5

Barrier Medium Comprising a Super-absorbent

85% by weight of the elasotmer/UHMWPE mixture provided in Example 3 is combined with 15% by weight carboxymethylcellulose (CMC) powder. The resulting mixture was filed into a cavity of an aluminum mold and heated to 360° F. for five minutes and then cooled to room temperature in five minutes. The resulting sintered porous polymeric material comprising the elastomer, UHMWPE, and CMC displayed an open pore structure with an average pore size of about 45 μm and a 40% porosity.

EXAMPLE 6

Barrier Medium Comprising a Color Change Indicator 99.95% by weight of the elastomer/UHMWPE/CMC mixture of Example 5 was mixed with 0.05% by weight food dye erioglaucine. The resulting mixture was filled into the cavity of an aluminum mold and heated to 360° F. for five minutes and cooled to room temperature in five minutes. The resulting sintered porous polymeric material comprising the elastomer, UHMWPE, CMC, and food dye displayed an open pore structure with an average pore size of about 45 μm and a porosity of about 40%.

EXAMPLE 7

Applicator Comprising a Sintered Porous Polymeric Material

KRATON® elastomers (styrene-ethylene-butadiene styrene) from Kraton Polymers US, LLC were cryogenically ground to powder, the powder having an average particle size of about 150 μm. 30% by weight of the elastomer powder was mixed with 70% by weight UHMWPE powder (Ticona) having an average particle size of about 150 μm. The resulting mixture was filled into the cavity of an aluminum mold having the shape of a nib applicator and heated to 360° F. for five minutes and then cooled to room temperature in five minutes. The resulting nib applicator comprising the sintered porous polymeric material was removed from the mold. The nib applicator comprising the sintered porous polymeric material comprising the elastomer and UHMWPE displayed an open pore structure with an average pore size of about 45 μm a porosity of about 45%.

EXAMPLE 8

Applicator Comprising a Flexible Region and a Rigid region

The bottom half of a mold was filled with the elastomer/UHMWPE powder mixture of Example 7. The top half of the mold was filled with UHMWPE (Ticona) having an average particle size of 150 μm. The mold, having the shape of an nib applicator with a shank was subsequently heated 360° F. for three minutes and then cooled to room temperature in three minutes. The resulting applicator comprising a sintered porous polymeric material displayed a flexible region corresponding to the tip of the applicator and a rigid region corresponding to the shank of the applicator. The flexible region displayed an open pore structure with an average pore size of about 45 μm and a porosity of about 45%, and the rigid region demonstrated an average pore size of about 40 μm and a porosity of about 45%.

EXAMPLE 9

Applicator Comprising a Sintered Porous Polymeric Component and a Fibrous Component KRATON® elastomers (styrene-ethylene-butadiene styrene) from Kraton Polymers US, LLC were cryogenic ground to powder form with average particle size around 150 μm. 30% by weight of the elastomer powder was mixed with 70% by weight UHMWPE powder (Ticona) having an average particle size of about 150 μm. The resulting mixture of was filled into a mold having the shape of a hollow nib structure and heated to 360° F. for three minutes and then cooled to room temperature in three minutes. The applicator nib comprising the sintered porous polymeric material displayed a hollow structure having an average pore size of about 45 μm and a porosity of about 45%. A fibrous component comprising a fiber rod produced by sintering bi-component fibers or impregnating fibers with thermosetting resin was inserted into the hollow structure in the elastic porous nibs. The bicomponent fibers were sintered in accordance with the methods disclosed in U.S. patent application Ser. No. 10/464,443.

EXAMPLE 10

Applicator Comprising a Sintered Porous Polymeric Component and a Fibrous Component The bottom part of a mold was filled with the elastomer/UHMWPE powder mixture of Example 7. The top part of the mold was filled with UHMWPE (Ticona) having an average particle size of 150 μm. The up part of the mold included a pin to produce hollow structure in the applicator nib. The mold was heated to 360° F. for three minutes and then cooled to room temperature in three minutes. The applicator nib was removed from the mold. The resulting applicator nib displayed a flexible region comprising the tip of the applicator and a hollow rigid region comprising the shank. The flexible region comprising the elastomer/UHMWPE displayed an open pore structure having an average pore size of about 45 μm and a porosity of about 45%, and the rigid region demonstrated an average pore size of about 40 microns and a porosity of about 45%. A fibrous component comprising produced in accordance with Example 9 was inserted into the hollow structure of the shank of the applicator nib.

EXAMPLE 11

Filtration Medium Comprising a Sintered Porous Polymeric Material

KRATON® elastomers (styrene-ethylene-butadiene styrene) from Kraton Polymers US, LLC were cryogenically ground to powder, the powder having an average particle size around 100 microns. 30% by weight of the elastomer powder was mixed with 70% UHMWPE powder (Ticona) having average particle size around 80 μm. The resulting mixture was filled into a plurality of cylinder shaped cavities (5 mm diameter and 4 mm deep) in an aluminum mold. The mold was heated to 360° F. for three minutes and then cooled to room temperature in three minutes. The filtration media comprising the sintered porous polymeric material were removed from the mold. The filtration media had open pore structures with an average pore size of about 18 μm and a porosity of about 40%.

The particulate KRATON® elastomers of Examples 3-11 can be substituted with cryogenically ground ENGAGE® TPO (ethylene-butene copolymer) from Dow Chemical to achieve similar materials. When ENGAGE® is used as the elastomeric material, the mold is heated to a temperature of about 320° F.

EXAMPLE 12

Applying an Ink Composition to a Surface

The applicator of Example 7 was loaded with an ink composition for application to paper. The applicator was loaded with ink by immersing at least a portion of the applicator in the ink. The applicator comprising the ink was subsequently placed in contact with the paper. The applicator applied the ink to the paper in an even and controlled fashion without bleeding or overflow.

EXAMPLE 13

Pipette Tip Comprising a Barrier Medium

The barrier medium of Example 6 was disposed in a pipette tip by inserting the barrier medium through the end of the pipette tip operable to receive the pipettor. Sufficient pressure was applied to the barrier medium during insertion to ensure that the barrier medium formed a seal with the interior surfaces of the pipette tip. After insertion of the barrier medium into the pipette tip, the pipette tip was attached to a pipettor. The pipette tip was placed in an aqueous solution, and the aqueous solution was drawn into the sample collection chamber of the pipette tip. As the aqueous solution was being drawn into the sample collection chamber, the pipette tip was removed from the aqueous solution resulting in aspiration, thereby bringing the aqueous solution into contact with the barrier medium. Upon contact with the aqueous solution, the CMC of the barrier material expanded and sealed the barrier medium precluding any aqueous solution from reaching the pipettor. The barrier medium additionally changed color indicating that the barrier medium had come into contact with the aqueous solution. Moreover, none of the aqueous solution circumvented barrier medium.

All patents, publications and abstracts cited above are incorporated herein by reference in their entirety. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

That which is claimed is:

1. A composition comprising:
a sintered porous polymeric material comprising a sintered mixture of particles of at least one plastic and particles of at least one thermoplastic elastomer, the sintered porous polymeric material having a porosity ranging from 20% to 80% and a rigidity of less than 5 pounds,
wherein the at least one plastic is selected from the group consisting of polyethylene, polypropylene, polyesters, polycarbonates, polyvinylidene fluoride, polytetrafluoroethylene, polyethersulfones, polystyrenes, polyether imides, polyetheretherketones, and polysulfones and combinations thereof, and wherein the at least one thermoplastic elastomer is selected from the group consisting of thermoplastic polyurethanes, polyisobutylene, polybutenes, polyethylene-propylene copolymer, polyethylene-butene copolymer, polyethylene-octene copolymer, polyethylene-hexene copolymer, chlorinated polyethylene, chloro-sulfonated polyethylene, styrene-ethylene-butadiene-styrene and 1,3-dienes and combinations thereof.

2. The composition of claim 1, wherein the 1,3-dienes comprise styrene-1,3-butadiene, carboxylated styrene-1,3-butadiene, acrylonitrile-1,3-butadiene, or isobutylene-isoprene or combinations thereof.

3. The composition of claim 1, wherein polyethylene comprises high density polyethylene or ultrahigh molecular weight polyethylene.

4. The composition of claim 1, wherein the particles of the at least one thermoplastic elastomer are present in an amount ranging from about 10 weight percent to about 90 weight percent.

5. The composition of claim 1, wherein the sintered porous polymeric material has an average pore size ranging from about 1 μm to about 200 μm.

6. The composition of claim 1, wherein the composition is an applicator, a filtration medium, or a barrier medium.

7. The composition of claim 1, further comprising at least one super-absorbent material.

8. A composition comprising:
a continuous sintered porous polymeric material comprising a flexible region and a rigid region, the flexible region comprising a sintered mixture of particles of a first plastic and particles of at least one thermoplastic elastomer, and the rigid region comprising sintered particles of a second plastic,
wherein the first plastic and the second plastic are independently selected from the group consisting of polyethylene, polypropylene, polyesters, polycarbonates, polyvinylidene fluoride, polytetrafluoroethylene, polyethersulfones, polystyrenes, polyether imides, polyetheretherketones, and polysulfones and combinations thereof, and wherein the at least one thermoplastic elastomer is selected from the group consisting of thermoplastic polyurethanes, polyisobutylene, polybutenes, polyethylene-propylene copolymer, polyethylene-butene copolymer, polyethylene-octene copolymer, polyethylene-hexene copolymer, chlorinated polyethylene, chloro-sulfonated polyethylene, styrene-ethylene-butadiene-styrene, and 1,3-dienes and combinations thereof.

9. The composition of claim 8, wherein the composition is an applicator, a filtration medium, or a barrier medium.

10. An applicator comprising:
a sintered porous polymeric material comprising a sintered mixture of particles of at least one plastic and particles of at least one thermoplastic elastomer, the sintered porous polymeric material having a porosity ranging from 20% to 80% and a rigidity of less than 5 pounds,
wherein the at least one plastic is selected from the group consisting of polyethylene, polypropylene, polyesters, polycarbonates, polyvinylidene fluoride, polytetrafluoroethylene, polyethersulfones, polystyrenes, polyether imides, polyetheretherketones, and polysulfones and combinations thereof; wherein the at least one thermoplastic elastomer is selected from the group consisting of thermoplastic polyurethanes, polyisobutylene, polybutenes, polyethylene-propylene copolymer, polyethylene-butene copolymer, polyethylene-octene copolymer, polyethylene-hexene copolymer, chlorinated polyethylene, chloro-sulfonated polyethylene, styrene-ethylene-butadiene-styrene, and 1,3-dienes and combinations thereof; and
a fibrous component coupled to the sintered porous polymeric material.

11. The applicator of claim 10, further comprising a reservoir coupled to the fibrous component.

12. The applicator of claim 10, wherein the fibrous component is a reservoir.

13. An apparatus comprising:
a housing; and
at least one filtration medium or at least one barrier medium disposed in the housing, wherein the at least one filtration medium or the at least one barrier medium comprises a sintered porous polymeric material comprising a sintered mixture of particles of at least one plastic and particles of at least one thermoplastic elastomer, the sintered porous polymeric material having a porosity ranging from 20% to 80% and a rigidity of less than 5 pounds,
wherein the at least one plastic is selected from the group consisting of polyethylene, polypropylene, polyesters, polycarbonates, polyvinylidene fluoride, polytetrafluoroethylene, polyethersulfones, polystyrenes, polyether imides, polyetheretherketones, and polysulfones and combinations thereof,
and wherein the at least one thermoplastic elastomer is selected from the group consisting of thermoplastic polyurethanes, polyisobutylene, polybutenes, polyethylene-propylene copolymer, polyethylene-butene copolymer, polyethylene-octene copolymer, polyethylene-hexene copolymer, chlorinated polyethylene, chloro-sulfonated polyethylene, styrene-ethylene-butadiene-styrene, and 1,3-dienes and combinations thereof.

14. The apparatus of claim 13, wherein the housing comprises a vacuum filtration housing, a chromatographic column, a funnel, a tube, a duct, a syringe, a catheter, or a pipette tip.

15. A method of producing a sintered porous polymeric material comprising:
providing particles of at least one thermoplastic elastomer;
providing particles of at least one plastic;
mixing the thermoplastic elastomer particles and the plastic particles uniformly; and
sintering the plastic particles and the elastomer particles;
wherein the sintered porous polymeric material has a porosity ranging from 20% to 80% and a rigidity of less than 5 pounds, and
wherein the at least one plastic is selected from the group consisting of polyethylene, polypropylene, polyesters, polycarbonates, polyvinylidene fluoride, polytetrafluoroethylene, polyethersulfones, polystyrenes, polyether imides, polyetheretherketones, and polysulfones and combinations thereof, and wherein the at least one thermoplastic elastomer is selected from the group consisting of thermoplastic polyurethanes, polyisobutylene, polybutenes, polyethylene-propylene copolymer, polyethylene-butene copolymer, polyethylene-octene copolymer, polyethylene-hexene copolymer, chlorinated polyethylene, chloro-sulfonated polyethylene, styrene-ethylene-butadiene-styrene, and 1,3-dienes and combinations thereof.

16. A method of producing a sintered porous polymeric material comprising:
disposing particles of a first plastic mixed with particles of at least one thermoplastic elastomer in a first part of a mold;
disposing particles of a second plastic in a second part of the mold adjacent to the first part of the mold; and
sintering the first plastic particles, the thermoplastic elastomer particles, and the second plastic particles to produce a flexible region comprising particles of the first plastic and the at least one thermoplastic elastomer, and a rigid region comprising particles of the second plastic;
wherein the first plastic and the second plastic are independently selected from the group consisting of polyethylene, polypropylene, polyesters, polycarbonates, polyvinylidene fluoride, polytetrafluoroethylene, polyethersulfones, polystyrenes, polyether imides, polyetheretherketones, and polysulfones and combinations thereof, and wherein the at least one thermoplastic elastomer is selected from the group consisting of thermoplastic polyurethanes, polyisobutylene, polybutenes, polyethylene-propylene copolymer, polyethylene-butene copolymer, polyethylene-octene copolymer, polyethylene-hexene copolymer chlorinated polyehylene, chloro-sulfonated polyethylene, styrene-ethylene-butadiene-styrene, and 1,3-dienes and combinations thereof.

17. A method of producing an apparatus comprising:
providing a filtration medium or a barrier medium comprising a sintered porous polymeric material comprising a sintered mixture of particles of at least one plastic and particles of at least one thermoplastic elastomer, the sintered porous polymeric material having a porosity ranging from 20% to 80% and a rigidity of less than 5 pounds,
wherein the at least one plastic is selected from the group consisting of polyethylene, polypropylene, polyesters, polycarbonates, polyvinylidene fluoride, polytetrafluoroethylene, polyethersulfones, polystyrenes, polyether imides, polyetheretherketones, and polysulfones and combinations thereof;
and wherein the at least one thermoplastic elastomer is selected from the group consisting of thermoplastic polyurethanes, polyisobutylene, polybutenes, polyethylene-propylene copolymer, polyethylene-butene copolymer, polyethylene-octene copolymer, polyethylene-hexene copolymer, chlorinated polyethylene, chloro-sulfonated polyethylene, styrene-ethylene-butadiene-styrene, and 1,3-dienes and combinations thereof
providing a housing; and
disposing the filtration medium or the barrier medium in the housing.

18. A method of producing an apparatus comprising:
providing a filtration medium or a barrier medium comprising a continuous sintered porous polymeric material comprising a flexible region and a rigid region, the flexible region comprising a sintered mixture of particles of a first plastic and particles of at least one thermoplastic elastomer, and the rigid region comprising sintered particles of a second plastic,
wherein the first plastic and the second plastic are independently selected from the group consisting of polyethylene, polypropylene, polycarbonates, polyesters, polyvinylidene fluoride, polytetrafluoroethylene, polyethersulfones, polystyrenes, polyether imides, polyetheretherketones, and polysulfones and combinations thereof;
and wherein the at least one thermoplastic elastomer is selected from the group consisting of thermoplastic polyurethanes, polyisobutylene, polybutenes, polyethylene-propylene copolymer, polyethylene-butene copolymer, polyethylene-octene copolymer, polyethylene-hexene copolymer, chlorinated polyethylene, chloro-sulfonated polyethylene, styrene-ethylene-butadiene-styrene, and 1,3-dienes and combinations thereof providing a housing; and disposing the filtration medium or the barrier medium in the housing.

19. The method of claim 18 further comprising forming a seal between the flexible region and the housing.

20. The method of claim 18, wherein the housing comprises a pipette tip.

21. The composition of claim 8, wherein the flexible region has a porosity ranging from 20 percent to 80 percent.

22. The composition of claim 8, wherein the flexible region has an average pore size ranging from 1 μm to 200 μm.

* * * * *